(12) United States Patent
Anabuki et al.

(10) Patent No.: US 7,671,875 B2
(45) Date of Patent: Mar. 2, 2010

(54) INFORMATION PROCESSING METHOD AND APPARATUS

(75) Inventors: Mahoro Anabuki, Cambridge, MA (US); Daisuke Kotake, Yokohama (JP); Shinji Uchiyama, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 789 days.

(21) Appl. No.: 11/235,556

(22) Filed: Sep. 26, 2005

(65) Prior Publication Data

US 2006/0071946 A1  Apr. 6, 2006

(30) Foreign Application Priority Data

Sep. 28, 2004  (JP)  ............... 2004-281309
Jul. 13, 2005  (JP)  ............... 2005-204515

(51) Int. Cl.
*G09G 5/00* (2006.01)
(52) U.S. Cl. ................... 345/633; 345/632
(58) Field of Classification Search ............ 345/633
See application file for complete search history.

(56) References Cited

U.S. PATENT DOCUMENTS

| | | | |
|---|---|---|---|
| 6,064,749 A * | 5/2000 | Hirota et al. ............ | 382/103 |
| 6,522,312 B2 | 2/2003 | Ohshima et al. | |
| 2002/0075201 A1* | 6/2002 | Sauer et al. ............ | 345/7 |
| 2002/0084974 A1* | 7/2002 | Ohshima et al. ........ | 345/156 |
| 2002/0126895 A1* | 9/2002 | Satoh .................... | 382/190 |
| 2004/0133379 A1* | 7/2004 | Kobayashi et al. ...... | 702/127 |
| 2004/0183926 A1* | 9/2004 | Fukuda et al. .......... | 348/239 |

FOREIGN PATENT DOCUMENTS

JP   11-136706 A   5/1999

OTHER PUBLICATIONS

Haralick, et al., "Review and analysis of solutions of the three point perspective pose . . . ," International Journal of Computer Vision, vol. 13, No. 3, pp. 331-356, 1994.
Lowe, "Fitting parameterized three-dimensional models to images," IEEE Transactions on PAMI, vol. 13, No. 5, pp. 441-450, 1991.
Uchiyama, et al., "A Robust Registration Method for Merging Real and Virtual Worlds—Combining 6 DOF Sensor and IPC Algorithm -," TVRSJ, vol. 1, pp. 119-126, 2003.
Baratoff, et al., "Interactive multi-marker calibration for augmented reality application," Proc. ISMAR 2002, pp. 107-116, 2002.

* cited by examiner

*Primary Examiner*—Kee M Tung
*Assistant Examiner*—Jacinta Crawford
(74) *Attorney, Agent, or Firm*—Canon U.S.A. Inc., I.P. Division

(57) ABSTRACT

In a case where a position and/or orientation of a shooting viewpoint is calculated by using information about image coordinates of markers placed in a scene, the present invention enables a user to easily determine positions of the markers so that the position and orientation can be calculated more accurately. Information about markers placed in a physical space is obtained and area information about mixing accuracy between a physical space image and a virtual space image is obtained based on the information about the markers, so that a virtual space image is generated in accordance with the obtained area information.

9 Claims, 15 Drawing Sheets

INFORMATION PROCESSING METHOD AND APPARATUS

BACKGROUND OF THE INVENTION

1. Field of the Invention

The present invention relates to an apparatus and a method for placing (or setting: hereinafter "place" includes "set") and/or deleting a marker in/from a scene in a case of calculating a position and orientation of a shooting viewpoint by using information about image coordinates in a captured image of markers placed in the scene.

2. Description of the Related Art

In recent years, studies on mixed reality have been actively conducted for the purpose of smoothly combining a physical space and a virtual space. An image display apparatus displaying mixed reality is realized by a video see-through method. In this method, an image of a virtual space (e.g., virtual objects or character information rendered by computer graphics) generated in accordance with a position and orientation of a viewpoint of an image capturing unit, such as a video camera, is mixed on an image of a physical space captured by the image capturing unit, and the mixed image is displayed.

As applications of such an image display apparatus, new fields different from conventional virtual reality are expected: for example, mixing body conditions on a body surface of a patient in order to aid an operation; and mixed reality games of fighting with a virtual enemy floating in a physical space.

Requirements common to these applications include how accurately the registration between a physical space and a virtual space should be performed, and considerable efforts have been made for this purpose. The problem of registration in mixed reality results in a problem of calculating a position and orientation of a shooting viewpoint in a scene (that is, in a world coordinate system).

In order to solve this problem, typically performed is obtaining a position and orientation of a shooting viewpoint in a scene by placing a plurality of markers in the scene and using coordinates in the world coordinate system of the markers and projection coordinates in an image captured by an image capturing unit.

The method of calculating a position and orientation of a shooting viewpoint based on a combination of coordinates in the world coordinate system of markers in a scene and projection coordinates thereof in a captured image has been traditionally suggested in a computer vision field and so on (e.g., see R. M. Haralick, C. Lee, K. Ottenberg, and M. Nolle, "Review and analysis of solutions of the three point perspective pose estimation problem," *International Journal of Computer Vision*, vol. 13, no. 3, pp. 331-356, 1994 (hereinafter "Haralick et al."); and D. G. Lowe: "Fitting parameterized three-dimensional models to images," *IEEE Transactions on PAMI*, vol. 13, no. 5, pp. 441-450, 1991) (hereinafter "Lowe").

Uchiyama, Yamamoto, and Tamura, "A Robust Registration Method for Merging Real and Virtual Worlds—Combining 6 DOF Sensor and IPC Algorithm—," *TVRSJ*, Vol. 1, pp. 119-126, 2003 (hereinafter "Uchiyama et al.") describes an example of applying such a method to registration in mixed reality. This document discloses a method of correcting, by using the method disclosed in Lowe, a position and orientation of a shooting viewpoint based on a position and orientation of a shooting viewpoint including an error obtained by measurement using a sensor so that coordinates in the world coordinate system of markers projected on a captured image match with image coordinates of the markers actually existing in the captured image.

One factor of determining registration accuracy in the above-described method (position matching between a physical space and a virtual space) is "a method of placing markers in a scene."

For example, in the method described in Uchiyama et al., an error in a position and orientation of a shooting viewpoint cannot be corrected if no marker can be captured, so that registration accuracy decreases. Therefore, the registration accuracy depends on whether markers are placed in such a manner that one or more markers can always be captured from an estimated shooting position.

Also, in the method described in Uchiyama et al., when an "orientation" of a shooting viewpoint includes an error due to an error included in coordinates in the world coordinate system of a marker and projected coordinates of the marker, the registration accuracy in a space far from the shooting viewpoint relative to the marker is significantly lower than near the marker (see FIG. 3: a physical space three-dimensionally deviates from a virtual space significantly). On the other hand, when a "position" of a shooting viewpoint includes an error due to an error in coordinates in the world coordinate system of a marker and projected coordinates of the marker, the registration accuracy in a space close to the shooting viewpoint relative to the marker is significantly lower than near the marker (see FIG. 4: an image of a physical space two-dimensionally deviates from an image of a virtual space significantly). Therefore, whether a marker is placed near a space is a factor in determining the registration accuracy in the space.

In view of the above-described things, highly accurate registration can be effectively realized by evenly placing markers in a scene.

However, an image characteristic of a marker in a shooting range may not be adequately captured depending on a position and orientation of a shooting viewpoint. For example, if a marker is planer, an image characteristic of the marker cannot be adequately captured when the marker is shot from a direction orthogonal to a normal of the plane. Of course, the image characteristic of the marker cannot be captured from a position where the marker cannot be seen because it is hidden in an object. Therefore, when "evenly placing markers," it is important to place the markers while considering the orientation of the markers so that a required number of markers whose image characteristic is adequately captured from an arbitrary position/orientation can be captured, in addition to evenly placing the markers in a scene.

However, if the markers are randomly placed or set in a scene, another disadvantage besides the registration accuracy occurs, for example, an increase in load of detecting markers and degradation in beauty of the scene. The latter problem should be avoided, that is, markers spoiling an appearance should be minimized in a physical space because mixed reality observed by a user includes the physical space as well as a virtual space. Therefore, markers should be "adequately" and evenly placed.

Accordingly, in a known method, markers are adequately and evenly placed in accordance with guidelines generated from some findings. For example, Japanese Patent Laid-Open No. 11-136706 (U.S. Pat. No. 6,522,312) discloses a method of adequately and evenly placing markers while decreasing a distribution density of markers in a space far from a shooting viewpoint and increasing a distribution density of markers near the shooting viewpoint.

However, the "guidelines generated from some findings" indicates only a desired tendency of placement of markers. Therefore, specific positions where markers should be placed are not indicated even if guidelines for placement of markers are given. That is, a method of placing markers determining registration accuracy has been left to the discretion of a person (user) who places markers.

SUMMARY OF THE INVENTION

The present invention is directed to enable a user to easily and adequately place markers used for calculating a position.

According to an aspect of the present invention, there is provided an information processing method for displaying a physical space and a virtual space by mixing the physical space and the virtual space. The information processing method includes: an obtaining step of obtaining information about markers placed in the physical space; a position/orientation calculating step of calculating a position and orientation of a viewpoint; an area calculating step of calculating area information about mixing accuracy between the physical space and the virtual space based on the information about the markers; and an image display step of displaying an image by visually representing the area information based on the position and orientation and by mixing the area information on the physical space.

According to another aspect of the present invention, there is provided an information processing method for aiding placement of markers used to calculate a position and orientation of a viewpoint in a physical space. The information processing method includes: a detecting step of detecting a marker area placed in the physical space from a captured image of the physical space; an area calculating step of calculating area information from which the position and orientation of the viewpoint can be calculated based on the marker area; and a display step of visually displaying the calculated area information.

Other features of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate exemplary embodiments of the invention and, together with the description, serve to explain the principles of the invention.

DESCRIPTION OF THE EMBODIMENTS

Exemplary embodiments of the present invention will now be described in detail in accordance with the accompanying drawings.

First Embodiment

A marker placing apparatus and a marker placing method according to this embodiment visually indicate an area where highly accurate registration is likely to be or not likely to be realized by already placed markers so as to present a place to be provided with a marker to a user (who places a marker). Also, the apparatus and method present effects of deleting an already placed marker on registration accuracy to the user. Hereinafter, the marker placing apparatus according to this embodiment is described.

Figure 1:
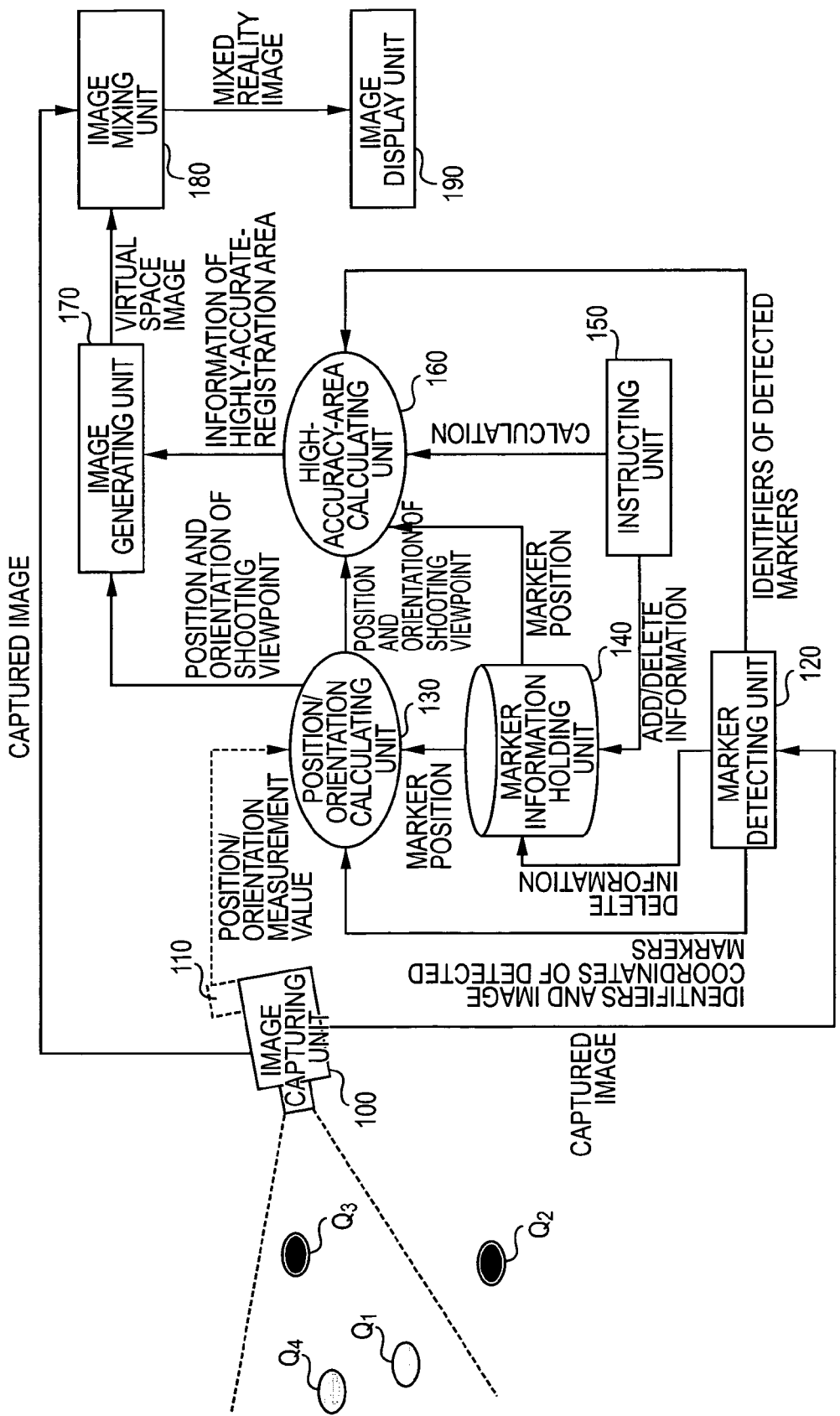
FIG. 1 shows an exemplary configuration of a marker placing apparatus according to a first embodiment.

FIG. 1 shows an exemplary configuration of the marker placing apparatus according to this embodiment. As shown in FIG. 1, the marker placing apparatus according to this embodiment includes an image capturing unit 100; a marker detecting unit 120; a position/orientation calculating unit 130; a marker information holding unit 140; an instructing unit 150; a high-accuracy-area calculating unit 160; an image generating unit 170; an image mixing unit 180; and an image display unit 190. Also, the marker placing apparatus may include a position/orientation measuring unit 110 as necessary.

The image capturing unit 100 captures an image of a physical space. The image captured by the image capturing unit 100 (hereinafter referred to as a "captured image") is input to the marker detecting unit 120 and the image mixing unit 180. In some cases, the image capturing unit 100 may be provided with the position/orientation measuring unit 110 measuring a position and/or orientation of a shooting viewpoint.

The position/orientation measuring unit 110 (not essential to the marker placing apparatus according to this embodiment) measures a position and/or orientation of a shooting viewpoint of the image capturing unit 100 in a world coordinate system (a coordinate system in which one point of a physical space is defined as an origin point and three axes orthogonal to each other are defined as an X-axis, a Y-axis, and a Z-axis, respectively). Measurement values of the position/orientation measuring unit 110 are input to the position/orientation calculating unit 130.

A plurality of markers $Q_k$ (k=1, ..., K) to be captured by the image capturing unit 100, positions thereof $x_w^{Qk}$ in the world coordinate system being known, are placed at a plurality of positions in a physical space. Alternatively, the markers will be placed by using the marker placing apparatus according to this embodiment. The markers $Q_k$ may be circular or elliptical markers having different colors or may be characteristic points, such as natural characteristics having different texture characteristics. Also, square markers formed by monochrome square areas having some dimension can be used. That is, any form of markers can be used as long as image coordinates of a projected image on a captured image can be detected and respective markers can be distinguished from each other.

The marker detecting unit 120 receives the captured image from the image capturing unit 100 and detects image coordinates of markers $Q_k$ existing in the received captured image. For example, when the markers $Q_k$ are markers having different colors, the marker detecting unit 120 detects areas corresponding to the respective colors from the captured image and sets their barycenters as detected coordinates of the markers. On the other hand, when the markers $Q_k$ are characteristic points having different texture characteristics, the marker detecting unit 120 detects positions of the markers by performing template matching, using template images of the respective markers that are held as known information, on the captured image. When square markers are used, labeling is performed after binarization is performed on the image, and then areas defined by four straight lines are detected as possible markers from an area having a predetermined dimension. Then, whether the possible markers have a specific pattern is determined to eliminate detection errors, so that identifiers of the markers are obtained. In this embodiment, square markers detected in this manner are four markers formed by four respective tops.

Image coordinates $u^{Qkn}$ and identifiers $k_n$ of the detected markers $Q_{kn}$ are output to the position/orientation calculating unit 130. The identifiers $k_n$ are also output to the high-accuracy-area calculating unit 160 as necessary. Herein, n (n=1, ..., N) is an index for the respective detected markers and N represents a total number of detected markers. For example, N=3 in FIG. 1, and identifiers $k_1$=1, $k_2$=3, and $k_3$=4 and corresponding image coordinates $u^{Qk1}$, $u^{Qk2}$, and $u^{Qk3}$ are output. When no marker is detected, nothing is output.

If the marker detecting unit 120 cannot detect a previously detected marker when the marker should be detected (when the marker should be included in the captured image) because the placed marker has been deleted by the user, the marker detecting unit 120 may transmit instructions to "delete information of a specified marker" indicating deletion of information about the marker to the marker information holding unit 140.

The position/orientation calculating unit 130 calculates the position and orientation of the shooting viewpoint of the image capturing unit 100 in the world coordinate system based on correspondence between image coordinates $u^{Qkn}$ of the respective markers $Q_{kn}$ detected by the marker detecting unit 120 and world coordinates $x_w^{Qkn}$ of the markers $Q_{kn}$ referred to by using the identifiers $k_n$ held as known information in the marker information holding unit 140. A method of calculating a position and orientation of a shooting viewpoint of an image capturing unit by using a combination of world coordinates and image coordinates of markers has been traditionally suggested in a computer vision field and so on (e.g., see Haralick et al. and Lowe). For example, when markers are placed on the same plane, a position and orientation of a viewpoint of the image capturing unit can be obtained based on two-dimensional homography calculation by detecting markers at four or more points. Also well known is a method of obtaining a position and orientation of a viewpoint of the image capturing unit by using markers at six or more points on different planes. In principle, the position and orientation of the image capturing unit can be estimated by using three or more markers that do not exist on the same straight line.

When the image capturing unit 100 is provided with the position/orientation measuring unit 110, the position/orientation calculating unit 130 may calculate the position and orientation of the shooting viewpoint of the image capturing unit 100 in the world coordinate system by using a measurement value from the position/orientation measuring unit 110. For example, by minimizing an error between a theoretical value of image coordinates of a marker calculated from measurement values of the position and orientation of the shooting viewpoint of the image capturing unit 100 and an actual measurement value of the image coordinates of the marker by iteration calculation such as a Gauss-Newton method using image Jacobian, the measurement values of the position and orientation of the shooting viewpoint can be optimized and the optimized value can be used as a calculation result.

Alternatively, one of the position and orientation measured by the position/orientation measuring unit 110 may be used as a calculated value. In this case, only the other of the orientation and position that was not measured may be calculated based on correspondence between the image coordinates $u^{Qkn}$ of the respective markers $Q_{kn}$ detected by the marker detecting unit 120 and the world coordinates $x_w^{Qkn}$ of the markers held as known information in the marker information holding unit 140. The calculation is performed by substituting the position or orientation measured by the position/orientation measuring unit 110 or the position or orientation held as known information in the position/orientation calculating unit 130 into one of unknown position and orientation.

Alternatively, one of the position and orientation held as known information in the position/orientation calculating unit 130 may be used as a calculation result, and the other may be calculated based on the markers.

The calculated position and orientation of the shooting viewpoint of the image capturing unit 100 in the world coordinate system are output to the image generating unit 170.

Also, the position/orientation calculating unit 130 outputs the position and orientation of the shooting viewpoint of the image capturing unit 100 in the world coordinate system to the high-accuracy-area calculating unit 160 in response to a request therefrom.

The marker information holding unit 140 holds positions $x_w^{Qk}$ in the world coordinate system of the markers $Q_k$ that are already placed in the physical space and their identifiers k. Also, the marker information holding unit 140 additionally holds a position $x_w^{QK+k'}$ in the world coordinate system of a marker $Q^{K+k'}$ (k'=1 ...) that is newly input by the user through the instructing unit 150 and its identifier K+k'. Further, the marker information holding unit 140 deletes information of a specified marker in accordance with instructions to "delete information of a specified marker" from the marker detecting unit 120 or the instructing unit 150.

The positions $x_w^{Qk}$ held by the marker information holding unit 140 are output to the position/orientation calculating unit 130 and the high-accuracy-area calculating unit 160.

The instructing unit 150 transmits instructions to "calculate a highly-accurate-registration area" to the high-accuracy-area calculating unit 160 when receiving a placement guidance execution command from the user.

Also, when the instructing unit 150 receives information indicating a position $x_w^{QK+k'}$ in the world coordinate system of a new marker $Q^{K+k'}$ and its identifier K+k' from the user, the instructing unit 150 transmits the information to the marker information holding unit 140. The information indicating the position $x_w^{QK+k'}$ may be obtained by actual measurement using a ruler or the like by the user, or may be obtained by calibrating a position and orientation of the marker based on a result obtained by capturing the marker in many images, as disclosed in G. Baratoff, A. Neubeck, and H. Regenbrecht, "Interactive multi-marker calibration for augmented reality application," *Proc. ISMAR* 2002, pp. 107-116, 2002) (Hereinafter "Baratoff et al.").

When the instructing unit 150 receives a placed marker deleting command and an identifier of the target marker from the user, the instructing unit 150 transmits instructions to "delete information of a specified marker" indicating deletion of information about a marker corresponding to the identifier to the marker information holding unit 140.

A command can be input to the instructing unit 150 by pushing a key allocated with a specific command on a keyboard or the like. The command can be input by any method, for example, by using a graphical user interface (GUI) displayed on a display. Information indicating the position $x_w^{QK+k'}$ in the world coordinate system of the marker $Q_{K+k'}$ and its identifier K+k' can also be input through a keyboard or the like.

When the high-accuracy-area calculating unit 160 receives instructions to "calculate highly-accurate-registration area" from the instructing unit 150, the high-accuracy-area calculating unit 160 also receives identifiers $K_n$ of the markers $Q_{kn}$ detected in the captured image from the marker detecting unit 120, receives the position and orientation of the shooting viewpoint of the image capturing unit 100 in the world coordinate system from the position/orientation calculating unit 130, and receives positions $x_w^{Qk}$ in the world coordinate system of the markers $Q_{kn}$ detected in the captured image from the marker information holding unit 140. Based on the received information, the high-accuracy-area calculating unit 160 calculates an area where highly accurate registration is likely to be realized (hereinafter referred to as a "highly-accurate-registration area" as necessary) and outputs information indicating the area to the image generating unit 170.

The high-accuracy-area calculating unit 160 of the marker placing apparatus according to this embodiment calculates a "highly-accurate-registration area" in accordance with a rule "registration accuracy at a position in a mixed reality space realized by a marker decreases in accordance with a distance from the detected marker in the mixed reality space." This rule is based on the above-described "whether a marker is placed near a space is a factor of determining the registration accuracy in the space." According to this rule and assuming that a distance "r" is a threshold, a sphere area having a radius "r" the center of which being a position of a marker $Q^{k0}$ is regarded as a "highly-accurate-registration area." Hence, the high-accuracy-area calculating unit 160 outputs information indicating the area, that is, a center position $x_w^{Qk0}$ of the sphere area and its radius $r^Q_{k0}$, to the image generating unit 170. Herein, the radius $r^{Qk0}$ is calculated as being "proportional to a distance $R^{Qk0}$ between the shooting viewpoint of the image capturing unit 100 and the marker." For example, an equation: $r^{Qk0}=0.3$ (constant)$\times R^{Qk0}$ is used. The distance $R^{Qk0}$ can be obtained from the position $x_w^{Qkn}$ of the marker $Q_k$ detected in the captured image received from the marker information holding unit 140 and the position of the shooting viewpoint received from the position/orientation calculating unit 130. By calculating the radius $R^{Qk0}$ in this manner, it can be prevented that a shooting viewpoint is included in a high-accuracy area in a mixed reality space and that a high-accuracy area in the space cannot be recognized. The "r" may be set in another method. For example, "r" may be set to a fixed value, e.g., r=10 cm.

When a plurality of markers are used for registration at the same time, the above-described rule is expanded as follows:

when two markers are used for registration, registration accuracy at a position decreases in accordance with a distance from a line segment connecting the two markers; and when three or more markers are used for registration, registration accuracy at a position decreases in accordance with a distance from the nearest plane among planes defined by line segments connecting three markers among the markers.

In these cases, a "highly-accurate-registration area" is calculated by replacing a "position of a marker" in a calculating method for one marker by "positions where all points on a line segment exist" or "positions where all points on a plane exist."

Figure 5:
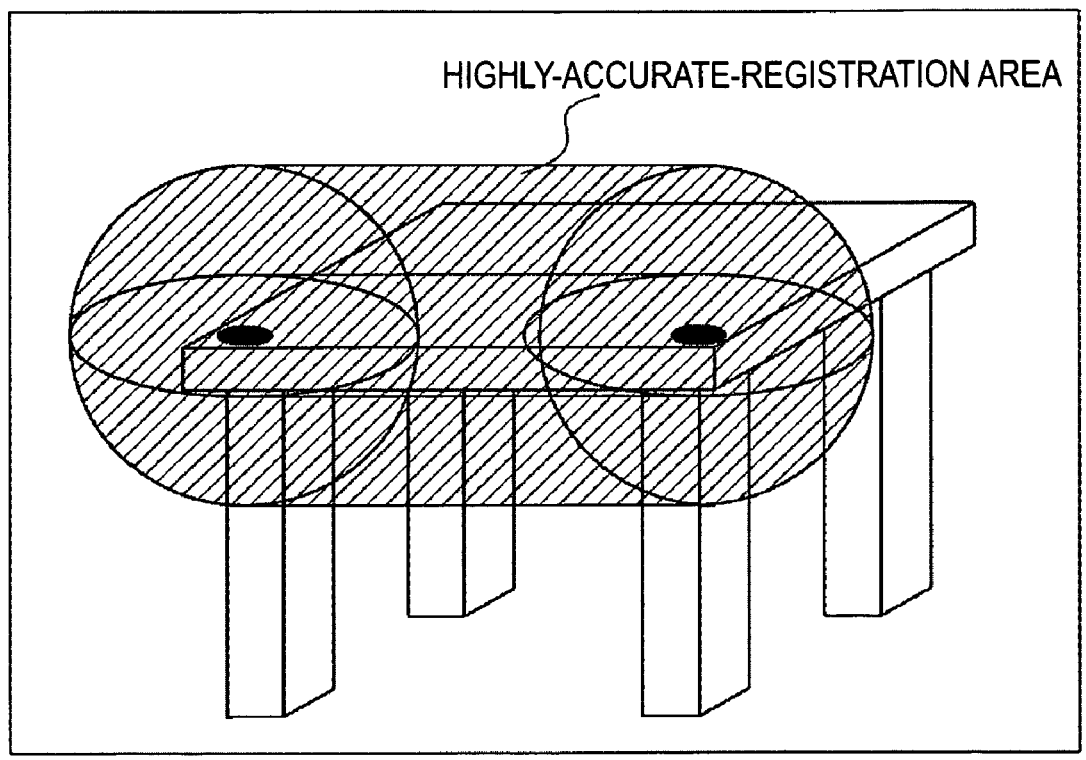
FIG. 5 is an image view showing a "highly-accurate-registration area" calculated when two markers are captured in an image in the marker placing apparatus according to the first embodiment.

When two markers $Q_{k0}$ and $Q_{k1}$ are used for registration, a sphere area having a center at a position $x_w^{Qk0Qk1}$ of an arbitrary point $P^{Qk0Qk1}$ on a line segment connecting those markers and a radius $r^{Qk0Qk1}$ determined based on a distance $R^{Qk0Qk1}$ between the viewpoint of the image capturing unit 100 and the point $P^{Qk0Qk1}$ is regarded as part of a "highly-accurate-registration area," and the sum of sphere areas determined based on all points on the line segment is regarded as the entire "highly-accurate-registration area." In this case, the "highly-accurate-registration area" is the sum of areas on bottom surfaces formed by dividing a cone area at a plane parallel with the bottom surface and hemisphere areas having the same radius and having contact on the bottom surface and a cut surface of the areas. The high-accuracy-area calculating unit 160 calculates information indicating this area (e.g., information indicating the above-mentioned cone, cut surface, and two hemispheres) and outputs the information to the image generating unit 170. FIG. 5 is an image view showing a "highly-accurate-registration area" that is calculated when two markers exist in the captured image.

When three or more markers are used for registration, a sphere area having a center at a position $x_w^{Qk0k1k2}$ of an arbitrary point $P^{Qk0Qk1Qk2}$ in a plane closed area defined by connecting three markers $Q_{k0}$, $Q_{k1}$, and $Q_{k2}$ among the markers used for registration is regarded as part of a "highly-accurate-registration area." The sphere area has a radius $r^{Qk0Qk1Qk2}$ determined based on a distance $R^{Qk0Qk1Qk2}$ between the point and the viewpoint of the image capturing unit 100. Further, the sum of sphere areas defined by all points on the plane closed area defined by all combinations of three markers that can be selected from the markers used for registration is the "highly-accurate-registration area" to be obtained.

In the high-accuracy-area calculating unit 160 of the marker placing apparatus according to this embodiment, the "highly-accurate-registration area" can be calculated in accordance with a rule "registration accuracy at a position in a mixed reality space varies according to an angle formed by a normal vector of a marker nearest to the position or a normal vector of a plane where the marker is placed and a visual line vector observing the mixed reality space, the registration accuracy decreases as the angle is approximate to a right angle, and the registration accuracy increases as the angle is closer to zero degrees." This rule is based on the fact that an image characteristic of a marker can be observed more clearly and an image projected position of the marker can be specified more accurately as the marker is captured from a front side, and thus registration accuracy can be enhanced. According to this rule, in a case where only one marker has been captured, when an angle formed by a visual line vector and a normal vector of the marker is smaller than a threshold θ, an entire area of the space observed at that time is regarded as a "highly-accurate-registration area," whereas when the angle is larger than the threshold θ, an entire area of the space observed at that time is not regarded as a "highly-accurate-registration area." When two or more markers have been captured, the space is divided into areas depending on a marker nearest to the viewpoint, and whether each of the respective areas is a "highly-accurate-registration area" is determined based on an angle formed by a visual line vector and a normal vector of a marker in the area.

Further, in the high-accuracy-area calculating unit 160 of the marker placing apparatus according to this embodiment, the "highly-accurate-registration area" can be calculated by using both of the above-described two rules or by using one of the rules according to the instructions from the user.

Further, in the high-accuracy-area calculating unit 160 of the marker placing apparatus according to this embodiment, a rule other than the two above-described rules can be used to calculate the "highly-accurate-registration area."

Information indicating the "highly-accurate-registration area" calculated by the high-accuracy-area calculating unit 160 is output to the image generating unit 170.

The image generating unit 170 generates a virtual space image by using the position and orientation of the shooting viewpoint of the image capturing unit 100 in the world coordinate system received from the position/orientation calculating unit 130 and virtual space information held in advance. The method thereof is well known and is not described here. The held virtual space information may include information about an object that exists in a physical space or a virtual object whose shape, position, and orientation completely match with those of part of the real object.

When receiving information indicating a "highly-accurate-registration area" from the high-accuracy-area calculating unit 160, the image generating unit 170 generates virtual object information representing an area where highly-accurate registration is likely to be or not likely to be realized based on the information, and also generates a virtual space image including the virtual object information. The area where highly-accurate registration is not likely to be realized is an area outside the "highly-accurate-registration area" determined based on all of the detected markers.

The virtual space image generated by the image generating unit 170 is output to the image mixing unit 180.

The image mixing unit 180 mixes the virtual space image received from the image generating unit 170 onto the captured image received from the image capturing unit 100 so as to generate a mixed reality space image. The mixed reality space image is output to the image display unit 190.

The image display unit 190 displays the mixed reality space image received from the image mixing unit 180 so as to present a mixed reality space to the user. In the mixed reality space, a place where a marker should be newly placed is presented. That is, when the mixed reality space image includes a virtual object representing an area where highly-accurate registration is likely to be realized, an area outside that area is a (possible) place where a marker should be newly placed. When the mixed reality space image includes a virtual object representing an area where highly-accurate registration is not likely to be realized, that area is a (possible) place where a marker should be newly placed.

Even when the mixed reality space image does not include a virtual object representing an area where highly-accurate registration is likely to be or not likely to be realized, if the mixed reality space image includes an object existing in the physical space or a virtual object whose shape, position, and orientation completely match with those of the object, it is regarded that the mixed reality space image presents a place where a marker should be newly placed. In other words, if the mixed reality space image includes a place where a (part of) real object is misaligned from a virtual object corresponding to the (part of) real object, an area near that place is regarded as a (possible) place where a marker should be newly placed.

Additionally, the image display unit 190 may be incorporated with the image capturing unit 100. In that case, the image capturing unit 100 and the image display unit 190 can function as a so-called head mounted display.

Next, a process performed by the marker placing apparatus according to this embodiment is described with reference to the flowchart shown in FIG. 2. The program code of this flowchart is stored in a memory (not shown) of this apparatus, such as a random access memory (RAM) or a read-only memory (ROM), and is read and executed by a central processing unit (CPU) (not shown).

After the process starts, the image capturing unit 100 captures an image of a physical space and outputs the captured image to the marker detecting unit 120 and the image mixing unit 180 in step S200. Then, the marker detecting unit 120 detects markers from the captured image and outputs the detection result, that is, image coordinates $u^{Q_{kn}}$ and identifiers $k_n$ of the detected markers $Q_{kn}$ to the position/orientation calculating unit 130 and the high-accuracy-area calculating unit 160.

Then, in step S210, if the marker placing apparatus includes the position/orientation measuring unit 110, the position/orientation measuring unit 110 measures a position and/or orientation of a shooting viewpoint of the image capturing unit 100. Then, regardless of the existence of the position/orientation measuring unit 110, the position/orientation calculating unit 130 calculates the position and orientation of the shooting viewpoint of the image capturing unit 100 in the world coordinate system. The calculated position and orientation of the shooting viewpoint are output from the position/orientation calculating unit 130 to the high-accuracy-area calculating unit 160 and the image generating unit 170.

In step S230, it is determined whether a placement guidance execution command has been input to the instructing unit 150 in the previous steps. If it is determined that a placement guidance execution command has been input and that the input has not been canceled, the process proceeds to step S240. On the other hand, if it is determined that a placement guidance execution command has not been input or that an input command has been canceled, the process proceeds to step S255. An input of the placement guidance execution command and its cancellation are performed at arbitrary timing through the instructing unit 150 by the user.

In step S240, the high-accuracy-area calculating unit 160 receives the identifiers $k_n$ of the markers $Q_{kn}$ detected from the captured image by the marker detecting unit 120, receives the position and orientation of the shooting viewpoint of the image capturing unit 100 in the world coordinate system from the position/orientation calculating unit 130, and receives positions $x_w^{Qkn}$ in the world coordinate system of the markers $Q_{kn}$ detected from the captured image from the marker information holding unit 140. Then, the high-accuracy-area calculating unit 160 calculates a "highly-accurate-registration area" based on the obtained information and outputs information indicating the area to the image generating unit 170.

Then, in step S255, the image generating unit 170 generates a virtual space image by using the position and orientation of the shooting viewpoint of the image capturing unit 100 in the world coordinate system received from the position/orientation calculating unit 130 and held virtual space information. As described above, the virtual space information may include information about an object existing in the physical space or a virtual object whose shape, position, and orientation completely match with those of the object. If it is determined in step S230 that a placement guidance execution command has been input to the instructing unit 150, the image generating unit 170 generates a virtual space image including a virtual object representing an area where highly accurate registration is likely to be or not likely to be realized by using the information indicating the "highly-accurate-registration area" received from the high-accuracy-area calculating unit 160. The generated virtual space image is output to the image mixing unit 180. The image mixing unit 180 mixes the virtual space image received from the image generating unit 170 onto the captured image received from the image capturing unit 100 so as to generate a mixed reality space image. The mixed reality space image is output to the image display unit 190. The image display unit 190 displays the mixed reality space image received from the image mixing unit 180 so as to present a mixed reality space to the user. In a state where the mixed reality space image is being presented to the user, the process proceeds to step S260.

In step S260, it is determined whether the user has input instructions to add a new marker or delete an already placed marker to the instructing unit 150 by seeing the mixed reality space image presented by the image display unit 190. For example, when the mixed reality space presented by the image display unit 190 includes a virtual object representing an area where highly accurate registration is likely to be realized and when the area does not cover an entire predetermined observed area, the user provides instructions to add a new marker. On the other hand, when the area covers the entire observed area, the user does not add any marker. Also, the user may provide instructions to delete an already placed marker. Further, for example, when the mixed reality space presented by the image display unit 190 includes a virtual object representing an area where highly accurate registration is not likely to be realized and when the area covers an entire observed area, the user provides instructions to add a new marker. On the other hand, when the area does not cover the entire observed area, the user does not add any marker. At this time, the user may provide instructions to delete an already placed marker. Still further, when the mixed reality space presented by the image display unit 190 does not include a virtual object representing an area where highly accurate registration is likely to be or not likely to be realized and when the mixed reality space includes an object existing in the physical space or a virtual object whose shape, position, and orientation completely match with those of part of the object, the user provides instructions to add a new marker if the mixed reality space image includes a place where a position and orientation of an object or part thereof existing in the physical space misalign from those of the corresponding virtual object. On the other hand, the user does not add any marker if there is no place where the both misalign from each other. At this time, the user may provide instructions to delete an already placed marker.

Whether a marker should be newly added or an already placed marker should be deleted is determined by the user while moving within a predetermined movement range. Ideally, determination to add/delete a marker should be performed for the observed area from all positions in the movement range.

If the user has provided instructions to place (add) or delete a marker, the process proceeds to step S270. Otherwise, the process proceeds to step S290.

In step S270, the user adds or deletes a desired marker while seeing the mixed reality space image presented by the image display unit 190.

A position of a marker to be placed is determined by the user based on the mixed reality space presented by the image display unit 190. For example, when the mixed reality space presented by the image display unit 190 includes a virtual object representing an area where highly accurate registration is likely to be realized, the user places a marker at a position outside the area. On the other hand, when the mixed reality space presented by the image display unit 190 includes a virtual object representing an area where highly accurate registration is not likely to be realized, the user places a marker at a position inside the area. Further, when the mixed reality space presented by the image display unit 190 does not include a virtual object representing an area where highly accurate registration is likely to be or not likely to be realized and when the mixed reality space includes an object existing in the physical space or a virtual object whose shape, position, and orientation completely match with those of part of the object, the user places a marker near a place where a position and orientation of an object or part of the object existing in the physical space misalign from those of the corresponding virtual object.

On the other hand, the user selects a marker to be deleted from among the already placed markers based on a placement distribution of the markers. Specifically, the user deletes part of the markers from an area where markers are most densely placed on the mixed reality space image. If the deletion causes a decrease in areas where highly accurate registration is likely to be realized or an increase in areas where highly accurate registration is not likely to be realized, the deletion may be canceled.

Addition or deletion of a marker may be performed a plurality of times at one time, or both addition and deletion may be performed in the same process.

After the user has added and/or deleted a marker, the process proceeds to step S280.

If a marker was added in step S270, information indicating a position $x_w^{QK+k'}$ in the world coordinate system and an identifier K+k' of the newly added marker $Q_{K+k'}$ is added to the marker information holding unit 140 in step S280. As described above, the information indicating the position $x_w^{QK+k'}$ may be obtained by using a ruler or the like by the user or may be obtained by using a calibration tool disclosed in Baratoff et al. This information is added to the marker information holding unit 140 through the instructing unit 150 by the user. Alternatively, a calibration tool (not shown) may be connected to the instructing unit 150 or the marker information holding unit 140 so that the information can be automatically added without requiring an operation by the user.

If a marker was deleted in step S270, information indicating a position $x_w^{QK}$ in the world coordinate system and an identifier k of the marker $Q_k$ deleted from the scene is deleted from the marker information holding unit 140 in step S280.

The deleted information is determined in accordance with instructions to "delete information of a specified marker" from the instructing unit 150 based on specification by the user. Alternatively, the deleted information is determined in accordance with instructions to "delete information of a specified marker" transmitted from the marker detecting unit 120 when the marker detecting unit 120 cannot detect a previously detected marker when the marker should be detected (when the captured image should include the marker).

After the information about the added marker has been added or after the information about the deleted marker has been deleted, the process proceeds to step S290.

In step S290, it is determined whether the process performed by the marker placing apparatus of this embodiment should be ended. The process is ended if the user instructs the marker placing apparatus to end the process, whereas the process returns to step S200 if the user instructs the apparatus to continue the process. After the process returns to step S200, the process restarts in a state where the placement status of the markers in the scene has been changed.

By performing the above-described process, the marker placing apparatus according to this embodiment presents an area where a marker should be newly placed to the user. Further, the marker placing apparatus notifies the user of effects of deleting placed markers on registration accuracy.

<Modification 1-1>

In the first embodiment, the user selects a marker to be deleted based on a placement distribution of markers and deletes the marker. If the deletion causes a decrease in high-accuracy areas, the user cancels an input deletion command to cancel deletion of the marker. However, the user can observe a change in high-accuracy areas before inputting a deletion command by selecting a possible marker to be deleted through the instructing unit 150 and by allowing the high-accuracy-area calculating unit 160 to calculate a high-accuracy area based on markers other than the selected marker. Accordingly, a marker can be efficiently deleted without requiring cancellation of a deletion command. A possible marker to be deleted is selected by incrementally changing an index k of markers by pushing a specific key on a keyboard.

<Modification 1-2>

In the first embodiment, the high-accuracy-area calculating unit 160 calculates a high-accuracy area by using markers that are detected and identified in the captured image. However, markers used for calculating a high-accuracy area are not limited to these markers, but the high-accuracy area can be calculated based on all markers existing in a scene or based on all markers near the markers that are detected and identified in the captured image.

<Modification 1-3>

In the first embodiment, a high-accuracy area is calculated based on a distance from a line segment connecting two markers when two markers exist, whereas a high-accuracy area is calculated based on a distance from a plane defined by three markers when three markers exist. The rule of calculating a high-accuracy area is not limited to the above-described ones. When a plurality of markers exist, a high-accuracy area (sphere area) may be calculated for each marker and virtual objects representing the respective sphere areas may be presented in a mixed reality space.

<Modification 1-4>

In the first embodiment, a position and orientation of a shooting viewpoint is calculated based on a projection image of markers existing in a scene. However, a method of calculating the position and orientation of the shooting viewpoint is not limited to this method, but another method may also be used. For example, a magnetic, ultrasonic, or optical six-degree-of-freedom position/orientation sensor may be attached to the image capturing unit, and a position and orientation of a shooting viewpoint may be calculated based on a measurement value from the sensor.

Second Embodiment

A marker placing apparatus and a marker placing method according to this embodiment present a position where a marker should be placed more clearly to a user by visually indicating an area where highly accurate registration is likely to be realized due to a newly placed marker before placing a marker and before placed position information is input. Hereinafter, the marker placing apparatus according to this embodiment is described.

Figure 6:
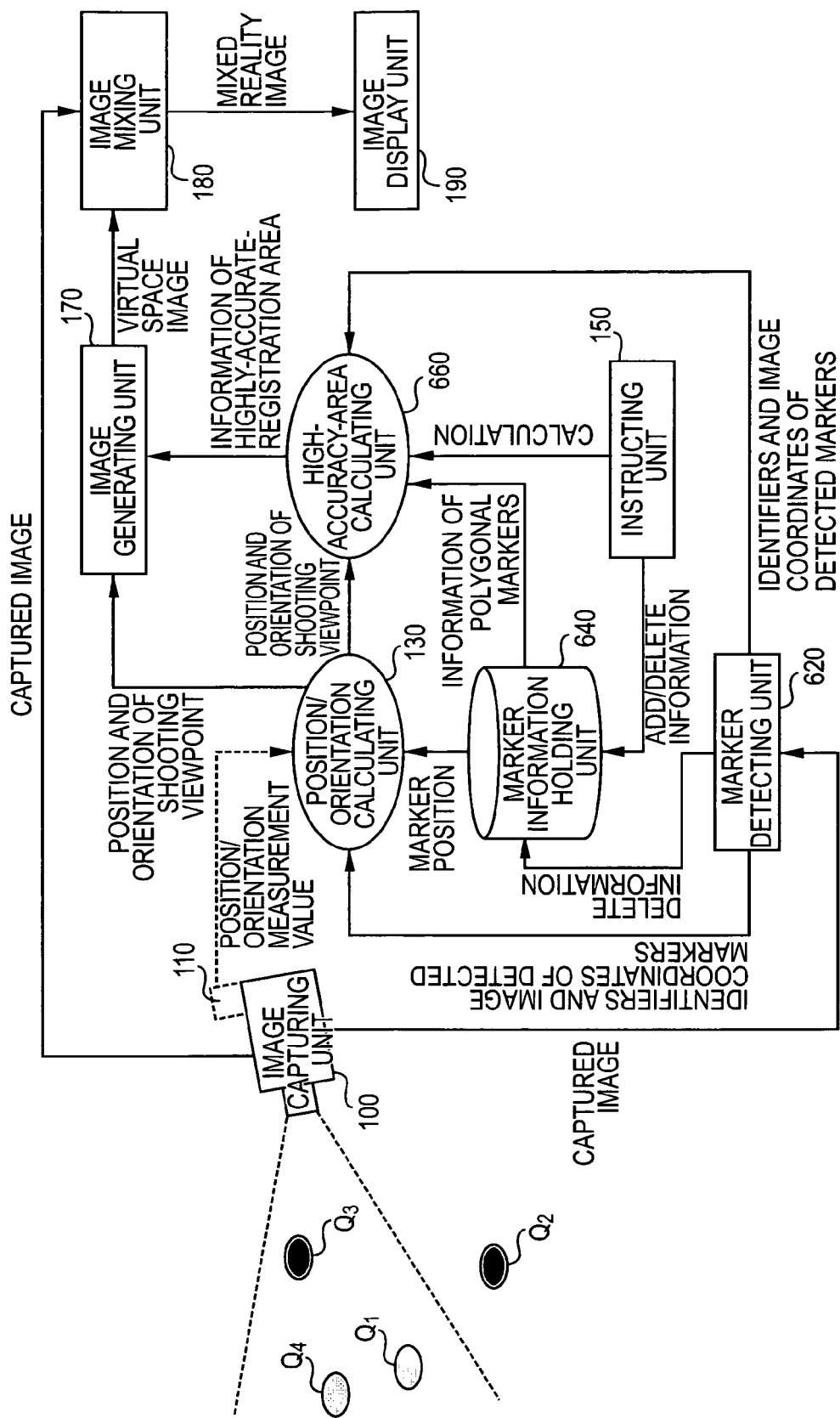
FIG. 6 shows an exemplary configuration of a marker placing apparatus according to a second embodiment.

FIG. 6 shows an exemplary configuration of the marker placing apparatus according to this embodiment. In FIG. 6, parts that are the same as those in FIG. 1 are denoted by the same reference numerals, and the corresponding description will not be repeated here. As shown in FIG. 6, the marker placing apparatus according to this embodiment includes an image capturing unit 100; a marker detecting unit 620; a position/orientation calculating unit 130; a marker information holding unit 640; an instructing unit 150; a high-accuracy-area calculating unit 660; an image generating unit 170; an image mixing unit 180; and an image display unit 190. Also, the marker placing apparatus according to this embodiment may include a position/orientation measuring unit 110 as necessary.

The image capturing unit 100 captures an image of a physical space. The image captured by the image capturing unit 100 is input to the marker detecting unit 620 and the image mixing unit 180. In some cases, the image capturing unit 100 may be provided with the position/orientation measuring unit 110 measuring a position and/or orientation of a shooting viewpoint.

The position/orientation measuring unit 110 (not essential to the marker placing apparatus according to this embodiment) measures a position and/or orientation of a shooting viewpoint of the image capturing unit 100 in the world coordinate system. Measurement values from the position/orientation measuring unit 110 are input to the position/orientation calculating unit 130.

A plurality of markers $Q_k$ (k=1, ..., K) to be captured by the image capturing unit 100, positions thereof $x_w^{Qk}$ in the world coordinate system being known, are placed at a plurality of positions in the physical space. The form of the markers $Q_k$ is the same as in the first embodiment. However, as markers $Q_{K+k'}$ to be newly placed in the physical space, polygonal markers (except a triangle) having a certain monochrome area whose shape and size are known are used. For example, square markers are used. As described above, these polygonal markers are a plurality of markers formed by respective tops of a polygon in this embodiment.

The marker detecting unit 620 receives the captured image from the image capturing unit 100 and detects image coordinates of markers existing in the received captured image. The detected markers include markers $Q_k$ that have already been placed in the physical space and markers $Q_{K+k'}$ that are held and will be placed by the user. Regarding the former markers $Q_k$, world coordinates $x_w^{Qk}$ and identifiers $k_n$ thereof are held in the marker information holding unit 640. Regarding the latter markers $Q_{K+k'}$, identifiers K+k' thereof are held in the marker information holding unit 640, but world coordinates $x_w^{Qk}$ thereof are not held in the marker information holding unit 640.

Image coordinates $u^{QKn}$ and identifiers $k_n$ of the detected placed markers $Q_{kn}$ are output to the position/orientation calculating unit 130. On the other hand, image coordinates $u^{QK+k'}$ and identifiers K+k' of the detected markers $Q_{K+k'}$ that are to be placed are output to the high-accuracy-area calculating unit 660.

If the marker detecting unit 620 cannot detect a previously detected marker when the marker should be detected (when the marker should be included in the captured image) because the placed marker has been deleted by the user, the marker detecting unit 620 may transmit instructions to "delete information of a specified marker" indicating deletion of information about the marker to the marker information holding unit 640.

The position/orientation calculating unit 130 calculates a position and orientation of a shooting viewpoint of the image capturing unit 100 in the world coordinate system based on correspondence between the image coordinates $u_{Qkn}$ of the respective markers $Q_{kn}$ detected by the marker detecting unit 620 and the world coordinates $x_w^{Qkn}$ of the markers referred to by using the identifiers $k_n$ held in the marker information holding unit 640 as known information.

When the image capturing unit 100 is provided with the position/orientation measuring unit 110, the position/orientation calculating unit 130 may calculate the position and orientation of the shooting viewpoint of the image capturing unit 100 in the world coordinate system by using a measurement value from the position/orientation measuring unit 110. For example, a measurement value of one of the position and orientation of the shooting viewpoint measured by the position/orientation measuring unit may be used as a calculation result, and the other may be calculated based on the markers. Alternatively, one of the position and orientation held as known information in the position/orientation calculating unit 130 may be used as a calculation result, and the other may be calculated based on the markers.

The calculated position and orientation of the shooting viewpoint of the image capturing unit 100 in the world coordinate system, calculated by the position/orientation calculating unit 130, are output from the position/orientation calculating unit 130 to the image generating unit 170.

Also, the position/orientation calculating unit 130 outputs the position and orientation of the shooting viewpoint of the image capturing unit 100 in the world coordinate system to the high-accuracy-area calculating unit 660 in response to a request therefrom.

The marker information holding unit 640 holds the positions $x_w^{Qk}$ in the world coordinate system of the markers $Q_k$ that are already placed in the physical space and their identifiers k. Further, the marker information holding unit 640 additionally holds a position $x_w^{QK+k'}$ in the world coordinate system of a marker $Q_{K+k'}$ (k'=1 . . . ) that is newly input through the instructing unit 150 by the user. Still further, the marker information holding unit 640 deletes information of a specified marker in response to instructions to "delete information of a specified marker" from the marker detecting unit 620 or the instructing unit 150.

The positions $x_w^{Qk}$ held in the marker information holding unit 640 are output to the position/orientation calculating unit 130.

As described above, all of newly placed markers are polygonal markers (except triangle) whose shape and size are known. Therefore, the marker information holding unit 640 holds identifiers K+k' of the markers $Q_{K+k'}$ that have not been placed in the physical space in unit of a group forming a polygonal marker, unlike the marker information holding unit 140 in the marker placing apparatus according to the first embodiment. Also, the marker information holding unit 640 holds information about relative positional relationship of those markers. Information about a combination of identifiers for the markers $Q_{K+k'}$ forming a polygonal marker and information about their relative positional relationship are output to the high-accuracy-area calculating unit 660.

When receiving a placement guidance execution command from the user, the instructing unit 150 transmits instructions to "calculate a highly-accurate-registration area" to the high-accuracy-area calculating unit 660.

When receiving information indicating a position $x_w^{QK+k'}$ in the world coordinate system of a new marker $Q_{K+k'}$ from the user, the instructing unit 150 transmits the information to the marker information holding unit 640.

When receiving a placed marker deletion command and an identifier of a target marker from the user, the instructing unit 150 transmits instructions to "delete information of a specified marker" indicating deletion of information about a marker corresponding to the identifier to the marker information holding unit 640.

After receiving instructions to "calculate a highly-accurate-registration area" from the instructing unit 150, the high-accuracy-area calculating unit 660 receives the identifiers $k_n$ of the markers $Q_{kn}$ detected from the captured image from the marker detecting unit 620, receives the position and orientation of the shooting viewpoint of the image capturing unit 100 in the world coordinate system from the position/orientation calculating unit 130, and receives the positions $x_w^{Qkn}$ in the world coordinate system of the placed markers $Q_{kn}$ that have been detected in the captured image from the marker information holding unit 640, as the high-accuracy-area calculating unit 160 in the marker placing apparatus according to the first embodiment. Based on the received information, the high-accuracy-area calculating unit 660 calculates an area where highly accurate registration is likely to be realized (highly-accurate-registration area) and outputs information indicating the area to the image generating unit 170.

Additionally, the high-accuracy-area calculating unit 660 can calculate the "highly-accurate-registration area" in the following method and output information indicating the area to the image generating unit 170. That is, after receiving instructions to "calculate a highly-accurate-registration area" from the instructing unit 150, the high-accuracy-area calculating unit 660 receives image coordinates $u^{QK+k'}$ and identifiers K+k' of the markers $Q_{K+k'}$ that have been detected from the captured image by the marker detecting unit 620 and that will be placed, and also receives information about combination of the markers $Q_{K+k'}$ forming a polygonal marker detected from the captured image and information about their relative positional relationship from the marker information holding unit 640. Based on the received information, the high-accuracy-area calculating unit 660 calculates the "highly-accurate-registration area" and outputs information indicating the area to the image generating unit 170. Hereinafter, this is described in detail.

When a polygonal marker except a triangle exists in the captured image, it means that four or more points of markers placed in the same plane have been detected. In this case, the position and orientation of the shooting viewpoint can be obtained based on a two-dimensional homography calculation using only the detection result of the markers. At this time, the position and orientation of the shooting viewpoint in the world coordinates are not calculated if the polygonal marker is not placed in the physical space, but a relative position and orientation of the polygonal marker and the shooting viewpoint can be calculated. In other words, the position and orientation of the shooting viewpoint on a coordinate system called a "polygonal marker coordinate system," one point on a polygonal marker being defined as an origin point and three axes orthogonal to each other being defined as an X-axis, a Y-axis, and a Z-axis, respectively, can be obtained even if a position in the world coordinate system of the marker is unknown. By obtaining the position and orientation of the shooting viewpoint on the polygonal marker coordinate system, a virtual object image can be displayed on the polygonal marker coordinate system.

By using this, the high-accuracy-area calculating unit 660 calculates a "highly-accurate-registration area" on the polygonal marker coordinate system regarding the polygonal marker that is held by the user and that is to be placed. When observed on the world coordinate system, the "highly-accurate-registration area" covers the periphery of the polygonal marker, and the position of the "highly-accurate-registration area" moves in accordance with a movement of the polygonal marker. Accordingly, the user can check a range where highly accurate registration is realized by the polygonal marker before placing the polygonal marker. The user can also check a range where highly accurate registration is realized by already placed markers, so that the user can determine a position to be provided with a polygonal marker while considering an overlapping state of the both ranges.

A method for calculating a "highly-accurate-registration area" of a polygonal marker before placing follows a method for calculating a "highly-accurate-registration area" of a placed marker. For example, the entire polygonal marker may be regarded as one marker and a "highly-accurate-registration area" may be calculated in accordance with a rule: "registration accuracy at a position decreases in accordance with a distance from a detected marker" or "registration accuracy at a position in a mixed reality space varies in accordance with an angle formed by a normal vector of the nearest marker to the position or a normal vector of a plane where the marker is placed and a visual line vector observing the mixed reality space, the registration accuracy decreases as the angle is approximate to a right angle, and the registration accuracy increases as the angle is approximate to zero degrees." Alternatively, the polygonal marker may be regarded as one plane, and a "position where a marker exists" in a calculating method performed on one marker may be replaced by "positions where all points on the plane exist."

Information indicating the "highly-accurate-registration area" calculated by the high-accuracy-area calculating unit 660 is output to the image generating unit 170.

The image generating unit 170 generates a virtual space image by using the position and orientation of the shooting viewpoint of the image capturing unit 100 in the world coordinate system received from the position/orientation calculating unit 130 and held virtual space information.

When receiving information indicating a "highly-accurate-registration area" from the high-accuracy-area calculating unit 660, the image generating unit 170 generates virtual object information representing an area where highly accurate registration is likely to be realized in accordance with the information and generates a virtual space image including the virtual object information.

The virtual space image generated by the image generating unit 170 is output to the image mixing unit 180.

The image mixing unit 180 mixes the virtual space image received from the image generating unit 170 onto the captured image received from the image capturing unit 100 so as to generate a mixed reality space image. The mixed reality space image is output to the image display unit 190.

The image display unit 190 displays the mixed reality space image received from the image mixing unit 180 so as to present a mixed reality space to the user. In the mixed reality space, a place where a marker should be newly placed is shown. That is, an area where highly accurate registration is likely to be realized is shown in the mixed reality space image, and an area outside the area is a (possible) place where a marker should be newly placed.

The image display unit 190 may be incorporated with the image capturing unit 100. In that case, the image capturing unit 190 and the image display unit 190 can function as a so-called head mounted display.

Figure 7:
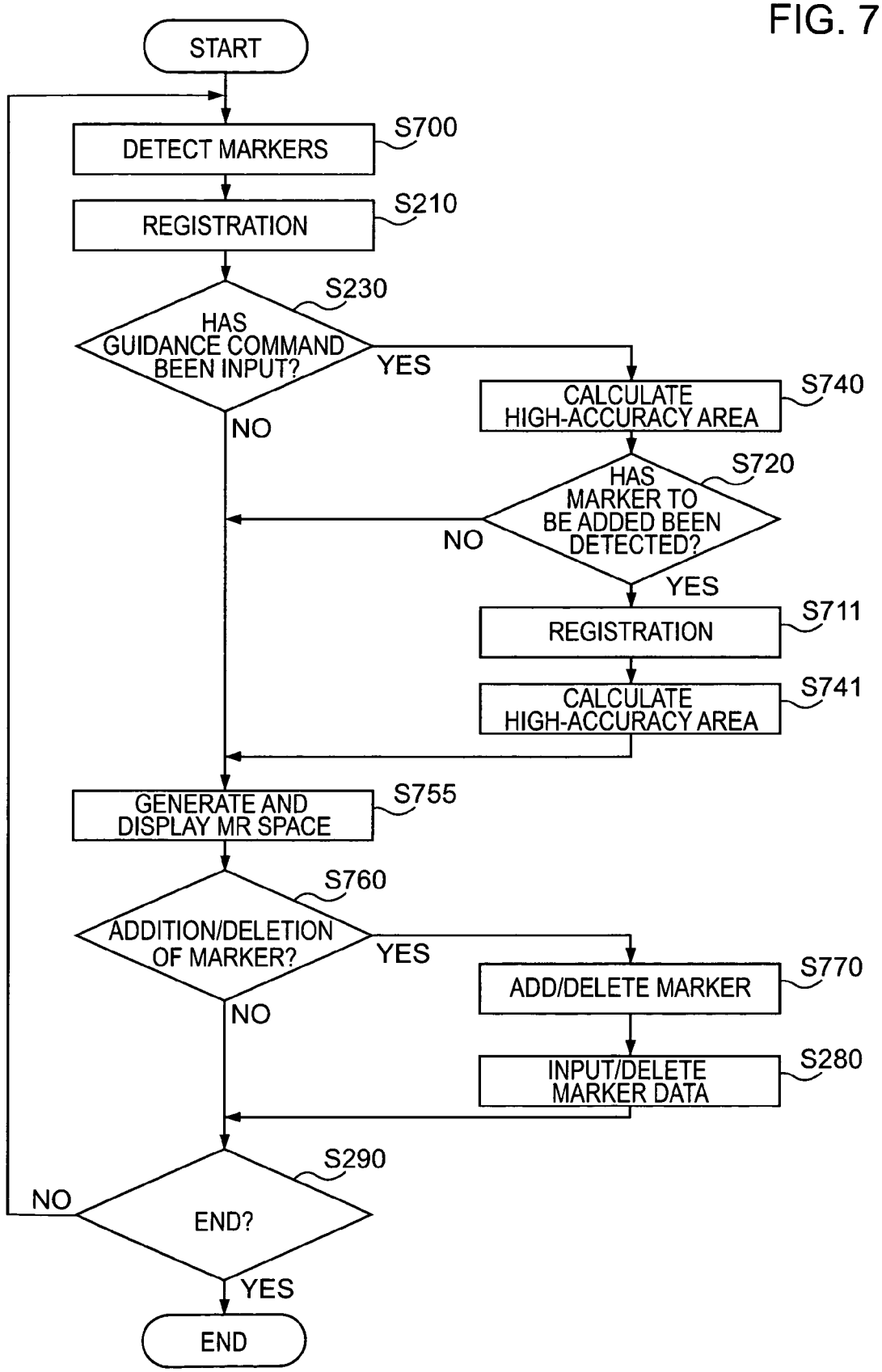
FIG. 7 is a flowchart showing a process performed by the marker placing apparatus according to the second embodiment.

Next, a process performed by the marker placing apparatus according to this embodiment is described with reference to the flowchart shown in FIG. 7. In FIG. 7, parts that are the same as those in FIG. 2 are denoted by the same reference numerals, and the corresponding description will not be repeated here. The program code of this flowchart is stored in a memory (not shown) of this apparatus, such as a RAM or a ROM, and is read and executed by a CPU (not shown).

After the process starts, the image capturing unit 100 captures an image of a physical space and outputs the captured image to the marker detecting unit 620 and the image mixing unit 180 in step S700. Then, the marker detecting unit 620 detects markers from the captured image and outputs part of a detection result, that is, image coordinates $u^{Q^{kn}}$ and identifiers $k_n$ of already placed markers $Q_{kn}$ to the position/orientation calculating unit 130. The residual detection result, that is, image coordinates $u^{Q^{k+k'}}$ and identifiers K+k' of markers $Q_{K+k'}$ that are to be placed are output to the high-accuracy-area calculating unit 660.

Then, in step S210, when the marker placing apparatus includes the position/orientation measuring unit 110, the position/orientation measuring unit 110 measures a position and/or orientation of a shooting viewpoint of the image capturing unit 100. Then, regardless of the existence of the position/orientation measuring unit 110, the position/orientation calculating unit 130 calculates the position and orientation of the shooting viewpoint of the image capturing unit 100 in the world coordinate system. The calculated position and orientation of the shooting viewpoint are output from the position/orientation calculating unit 130 to the high-accuracy-area calculating unit 660 and the image generating unit 170.

In step S230, it is determined whether a placement guidance execution command has been input to the instructing unit 150. If the placement guidance execution command has been input and if the input has not been cancelled, the process proceeds to step S740. On the other hand, if the placement guidance execution command has not been input or if the input has been cancelled, the process proceeds to step S755. The input of the placement guidance execution command and cancellation of the input are performed at arbitrary timing through the instructing unit 150 by the user.

In step S740, the high-accuracy-area calculating unit 660 receives the identifiers $k_n$ of the markers $Q_{kn}$ detected in the captured image from the marker detecting unit 620, receives the position and orientation of the shooting viewpoint of the image capturing unit 100 in the world coordinate system from the position/orientation calculating unit 130, and receives positions $x_w^{Q^{kn}}$ of the markers $Q_{kn}$ in the world coordinate system detected in the captured image from the marker information holding unit 640. Based on the received information, the high-accuracy-area calculating unit 660 calculates a "highly-accurate-registration area" and outputs information indicating the area to the image generating unit 170.

Then, in step S720, it is determined whether markers $Q_{K+k'}$ that are to be placed have been detected in the captured image. If the markers $Q_{K+k'}$ have been detected, the process proceeds to step S711. Otherwise, the process proceeds to step S755.

In step S711, a relative position and orientation of the markers $Q_{K+k'}$ detected in the captured image and the image capturing unit 100 are calculated by the same method as in step S210. In step S741, the high-accuracy-area calculating unit 660 receives image coordinates $u^{QK+k'}$ and identifiers K+k' of the markers $Q_{K+k'}$ that have been detected in the captured image and that are to be placed from the marker detecting unit 620 and also receives information about combination of the markers $Q_{K+k'}$ detected in the captured image forming a polygonal marker and information about relative positional relationship thereof from the marker information holding unit 640. Based on the received information, the high-accuracy-area calculating unit 660 calculates a "highly-accurate-registration area" and outputs information indicating the area to the image generating unit 170. Then, in step S755, the image generating unit 170 generates a virtual space image by using the position and orientation of the shooting viewpoint of the image capturing unit 100 in the world coordinate system received from the position/orientation calculating unit 130 and held virtual space information. If it is determined in step S230 that a placement guidance execution command has been input, the image generating unit 170 generates a virtual space image including a virtual object representing an area where highly accurate registration is likely to be realized by using information indicating the "highly-accurate-registration area" received from the high-accuracy-area calculating unit 660. The generated virtual space image is output to the image mixing unit 180. The image mixing unit 180 mixes the virtual space image received from the image generating unit 170 onto the captured image received from the image capturing unit 100 so as to generate a mixed reality space image. The mixed reality space image is output to the image display unit 190. The image display unit 190 displays the mixed reality space image received from the image mixing unit 180 so as to present a mixed reality space to the user. In a state where the mixed reality space image is being presented to the user, the process proceeds to step S760.

In step S760, it is determined whether the user has provided instructions to add a new polygonal marker or delete an already placed marker through the instructing unit 150. Since the "highly-accurate-registration area" is shown by a virtual object in the mixed reality space presented by the image display unit 190, the user determines to add a new polygonal marker if the area does not cover an entire predetermined observed area. On the other hand, if the area covers the entire observed area, the user determines not to add any polygonal marker. The user may also determine to delete an already placed marker.

Whether a new polygonal marker should be added or an already placed marker should be deleted is determined while moving in a predetermined movement range. Ideally, determination to add/delete a marker should be performed for areas observed from all positions in the movement range.

If the user provides instructions to place a polygonal marker or delete a marker, the process proceeds to step S770. Otherwise, the process proceeds to step S290.

In step S770, the user adds or deletes a desired marker while seeing the mixed reality space image presented by the image display unit 190.

A position to be provided with a polygonal marker is determined by the user based on the mixed reality space presented by the image display unit 190. The "highly-accurate-registration area" is shown by a virtual object in the mixed reality space presented by the image display unit 190, and thus the user sets a place outside the area as a placed position. At this time, by using a situation where a virtual object representing the "highly-accurate-registration area" is displayed around the polygonal marker that is held by the user and that is to be placed, the user places a new polygonal marker so that the "highly-accurate-registration area" defined by the placed markers adequately overlaps the "highly-accurate-registration area" defined by the polygonal marker to be placed while preventing a gap therebetween being made.

The user moves the polygonal marker in order to place the polygonal marker at an appropriate position. During the movement, the mixed reality space image is kept presented to the user, and the image varies in accordance with the position and orientation of the shooting viewpoint of the image capturing unit 100 and the position of the polygonal marker.

If a marker is added in step S770, information indicating a position $x_w^{QK+k'}$ in the world coordinate system of the newly added marker $Q_{K+k'}$ is added to the marker information holding unit 640 in step S280. This information is added to the marker information holding unit 640 through the instructing unit 150 by the user. Alternatively, a calibration tool (not shown) is connected to the instructing unit 150 or the marker information holding unit 640, so that information is automatically added without requiring an operation by the user.

If a marker is deleted in or after step S770, information indicating a position $x_w^{Qk}$ in the world coordinate system of the marker $Q_k$ deleted from the scene is deleted from the marker information holding unit 640 in step S280. Deleted information is determined in accordance with instructions to "delete information of a specified marker" from the instructing unit 150 based on the instructions from the user. Alternatively, the deleted information is determined in accordance with instructions to "delete information of a specified marker" from the marker detecting unit 620 that is transmitted when the marker detecting unit 620 cannot detect a previously detected marker when the marker should be detected (when the captured image should include the marker).

After information about the added marker has been added or after information about the deleted marker has been deleted, the process proceeds to step S290.

In step S290, it is determined whether the process performed by the marker placing apparatus of this embodiment should be ended. If the user instructs the marker placing apparatus to end the process, the process is ended. If the user instructs the apparatus to continue the process, the process returns to step S700. After the process returns to step S700, the process restarts in a state where a placement state of markers in the scene is changed.

By performing the above-described process, the marker placing apparatus according to this embodiment visually indicates an area where highly accurate registration is likely to be realized by a newly placed marker before placement or input of placed position information, so as to present a position where a marker should be placed to the user more clearly.

<Modification 2-1>

In the second embodiment, a newly added marker is a polygonal marker. A relative position and orientation of the polygonal marker and the image capturing unit are calculated based on a projected image of the polygonal marker in the captured image, a highly-accurate-registration area is displayed on the moved polygonal marker, and the highly-accurate-registration area is observed together with a highly-accurate-registration area of an already placed marker. Accordingly, a place to be provided with a marker is presented to the user. However, instead of the highly-accurateregistration area displayed on the polygonal marker held by the user, a highly-accurate-registration area of a different type of marker (e.g., circular markers having different colors) may be displayed, and how the highly-accurate-registration area changes when the different type of markers are placed may be presented to the user. At this time, the user switches the highly-accurate-registration areas to be displayed on the polygonal marker by using the instructing unit 150. In this way, even in a marker whose position in the world coordinate system cannot be calculated from a projected image of one camera, a highly-accurate-registration area can be presented to the user before placing the marker as in the second embodiment.

<Modification 2-2>

In the second embodiment, a polygonal marker is used so that a relative position and orientation of the image capturing unit and the marker can be calculated based on a projected image of the marker. However, another method can be used as long as a position or a position and orientation of a marker in the world coordinate system can be calculated. For example, a six-degree-of-freedom position/orientation sensor, such as a magnetic sensor, may be attached to a marker and the position and orientation of the marker in the world coordinate system may be measured. Alternatively, the position or the position and orientation of the marker may be calculated by using a known method based on images captured by a plurality of cameras whose position and orientation in the world coordinate system are known.

<Modification 2-3>

In the second embodiment, a position and orientation of a shooting viewpoint in the world coordinate system are calculated based on a projected image of markers existing in a scene. However, a method for calculating the position and orientation of the shooting viewpoint is not limited this method, but another method may also be used. For example, a magnetic, ultrasonic, or optical six-degree-of-freedom position/orientation sensor may be attached to the image capturing unit and the position and orientation of the shooting viewpoint may be calculated based on a measurement value from the sensor.

Third Embodiment

A marker placing apparatus and a marker placing method according to a third embodiment presents an area where highly accurate registration is likely to be performed to a user in a simpler method. Hereinafter, the marker placing apparatus according to this embodiment is described.

Figure 8:
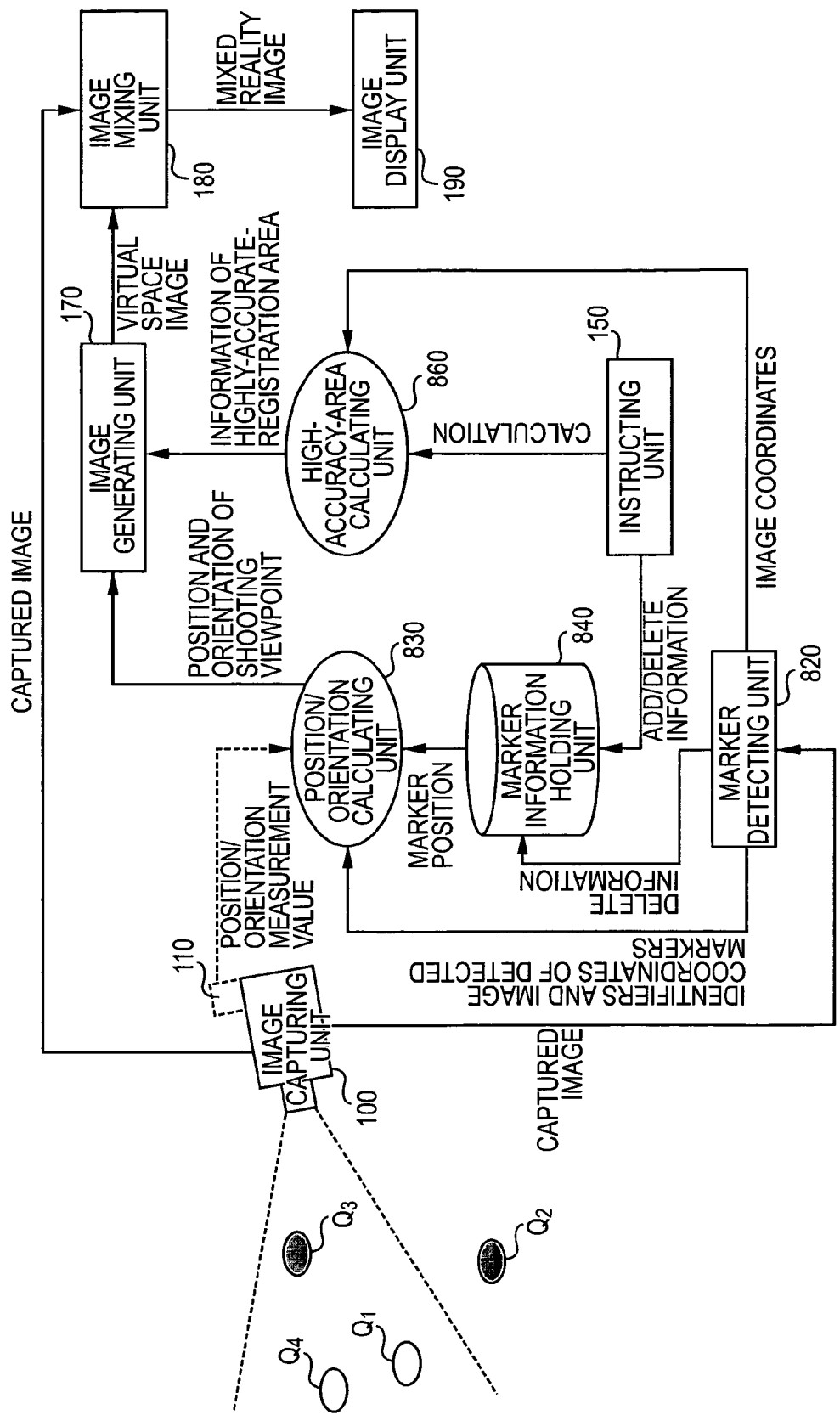
FIG. 8 is an exemplary configuration of a marker placing apparatus according to a third embodiment.

FIG. 8 shows an exemplary configuration of the marker placing apparatus according to this embodiment. In FIG. 8, parts that are the same as those in FIG. 1 are denoted by the same reference numerals, and the corresponding description will not be repeated here. As shown in FIG. 8, the marker placing apparatus according to this embodiment includes an image capturing unit 100; a marker detecting unit 820; a position/orientation calculating unit 830; a marker information holding unit 840; an instructing unit 150; a high-accuracy-area calculating unit 860; an image generating unit 170; an image mixing unit 180; and an image display unit 190. The marker placing apparatus according to this embodiment may include a position/orientation measuring unit 110 as necessary.

The image capturing unit 100 captures an image of a physical space. The image captured by the image capturing unit 100 is input to the marker detecting unit 820 and the image mixing unit 180. In some cases, the image capturing unit 100 may be provided with the position/orientation measuring unit 110 measuring a position and/or orientation of a shooting viewpoint of the image capturing unit 100.

The position/orientation measuring unit 110 (not essential to the marker placing apparatus according to this embodiment) measures the position and/or orientation of the shooting viewpoint of the image capturing unit 100 in the world coordinate system. Measurement values from the position/orientation measuring unit 110 are input to the position/orientation calculating unit 830.

A plurality of markers $Q_k$ (k=1, ..., K) to be captured by the image capturing unit 100, positions thereof $x_w^{Qk}$ in the world coordinate system being known, are placed at a plurality of positions in the physical space. The form of the markers $Q_k$ is the same as in the first embodiment.

The marker detecting unit 820 receives the captured image from the image capturing unit 100 and detects image coordinates of the markers $Q_k$ existing in the received captured image.

Image coordinates $u^{Qkn}$ and identifiers $k_n$ of the detected markers $Q_{kn}$ are output to the position/orientation calculating unit 830. Also, the image coordinates $u^{Qkn}$ of the detected markers $Q_{kn}$ are output to the high-accuracy-area calculating unit 860.

If the marker detecting unit 820 cannot detect a previously detected marker when the marker should be detected (when the marker should be included in the captured image) because the placed marker has been deleted by the user, the marker detecting unit 820 may transmit instructions to "delete information of a specified marker" indicating deletion of information about the marker to the marker information holding unit 840.

The position/orientation calculating unit 830 calculates the position and orientation of the shooting viewpoint of the image capturing unit 100 in the world coordinate system based on the correspondence between the image coordinates $u^{Qkn}$ of the markers $Q_{kn}$ detected by the marker detecting unit 820 and the world coordinates $x_w^{Qkn}$ of the markers referred to by using the identifiers $k_n$ held in the marker information holding unit 640 as known information.

When the image capturing unit 100 is provided with the position/orientation measuring unit 110, the position/orientation calculating unit 830 may calculate the position and/or orientation of the shooting viewpoint of the image capturing unit 100 in the world coordinate system by using a measurement value from the position/orientation measuring unit 110. For example, a measurement value of one of the position and orientation of the shooting viewpoint measured by the position/orientation measuring unit 110 may be used as a calculation result and the other may be calculated based on the markers. Alternatively, one of the position and orientation held as known information in the position/orientation calculating 830 unit may be used as a calculation result and the other may be calculated based on the markers.

The calculated position and orientation of the shooting viewpoint of the image capturing unit 100 in the world coordinate system are output to the image generating unit 170.

The marker information holding unit 840 holds the position $x_w^{Qk}$ in the world coordinate system of the markers $Q_k$ that are already placed in the physical space and their identifiers k. Also, the marker information holding unit 840 additionally holds a position $x_w^{QK+k'}$ in the world coordinate system of a marker $Q_{K+k'}$ (k'=1 ...) that is newly input by the user through the instructing unit 150 and its identifier K+k'. Further, the marker information holding unit 840 deletes information about a specified marker in response to instructions to "delete information of a specified marker" from the marker detecting unit 820 or the instructing unit 150.

The positions $x_w^{Qk}$ held by the marker information holding unit 840 are output to the position/orientation calculating unit 830.

The instructing unit 150 transmits instructions to "calculate highly-accurate-registration area" to the high-accuracy-area calculating unit 860 upon receiving a placement guidance execution command from the user.

Also, when receiving information indicating the position $x_w^{QK+k'}$ in the world coordinate system of a new marker $Q_{K+k'}$ from the user, the instructing unit 150 transmits the information to marker information holding unit 840.

Also, when receiving a placed marker deleting command and an identifier of a target marker from the user, the instructing unit 150 transmits instructions to "delete information of a specified marker" indicating deletion of information about a marker corresponding to the identifier to the marker information holding unit 840.

As the high-accuracy-area calculating unit 160 in the marker placing apparatus according to the first embodiment, the high-accuracy-area calculating unit 860 receives the image coordinates $u^{Qkn}$ of the markers $Q_n$ detected in the captured image from the marker detecting unit 820 when receiving instructions to "calculate highly-accurate-registration area" from the instructing unit 150. Based on the received information, the high-accuracy-area calculating unit 860 calculates an area where highly accurate registration is likely to be performed ("highly-accurate-registration area") and outputs information indicating the area to the image generating unit 170.

Figure 10:
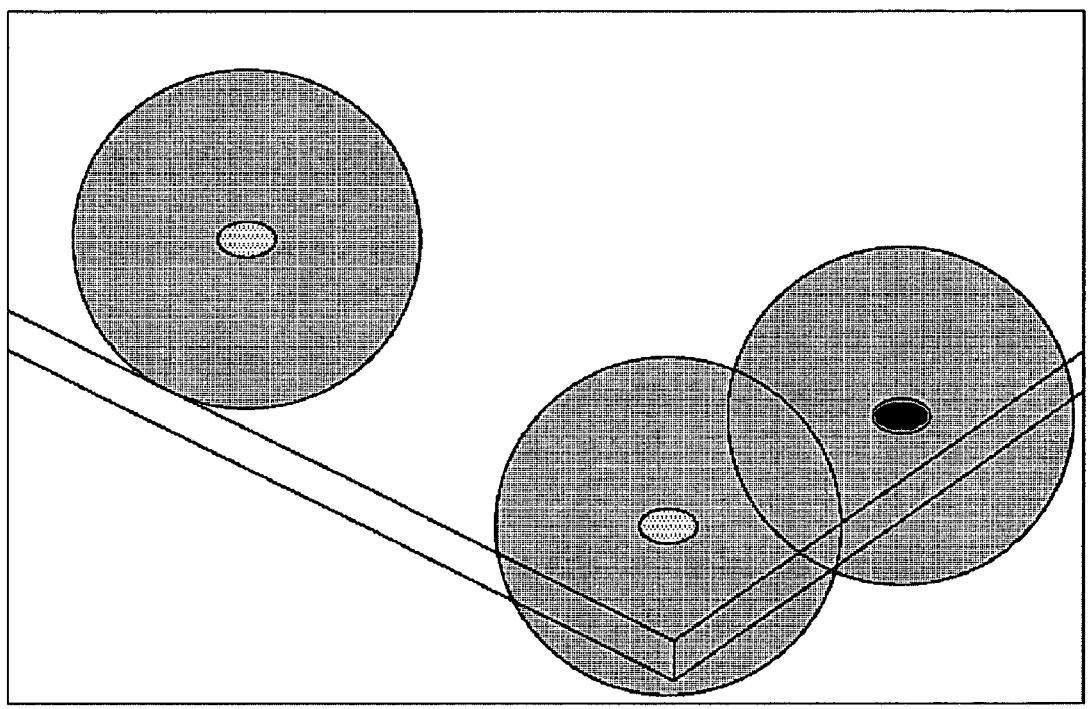
FIG. 10 is an image view showing "highly-accurate-registration areas" calculated in the marker placing apparatus according to the third embodiment.

In the high-accuracy-area calculating unit 860 in the marker placing apparatus according to this embodiment, the "highly-accurate-registration area" is calculated in accordance with a rule "registration accuracy at a position on a mixed reality space image decreases in accordance with a distance from a detected marker on the mixed reality space image." This rule is based on the above-described "whether a marker is placed near a space is one factor of determining the registration accuracy in the space." According to this rule and assuming that a distance "r" is a threshold, a circle area on the mixed reality space image having a radius "r," with a position of a detected marker $Q_{k0}$ on the image being its center, is regarded as a "highly-accurate-registration area." Therefore, the high-accuracy-area calculating unit 860 outputs information indicating the area, that is, center image coordinates $u^{Qkn}$ and the radius "r" of the circle, to the image generating unit 170. Herein, the distance "r" is calculated as being "proportional to a size of a detected marker on the captured image." This is because the position of a marker can be specified more accurately as the size thereof on an image that is larger. For example, an equation: r=5 (constant)×(radius of a circumcircle of a detected marker on captured image) is used. FIG. 10 is an image view showing "highly-accurate-registration areas" calculated by the high-accuracy-area calculating unit 860 in the marker placing apparatus according to this embodiment. The "r" may be set by another method.

The image coordinates of a marker on the captured image can be detected even when the position of the marker in the world coordinate system is unknown. By using this, the high-accuracy-area calculating unit 860 calculates a "highly-accurate-registration area" for a marker to be placed. In this case, the "highly-accurate-registration area" covers the periphery of a marker to be placed, and when the user moves the marker, the position of the "highly-accurate-registration area" moves accordingly. Therefore, the user can check a range where highly accurate registration is realized by the marker before placing the marker. The user can also check a range where highly accurate registration is realized by already placed markers, and thus the user can determine a place where a marker should be placed while considering an overlap between the ranges.

Also, in the high-accuracy-area calculating unit 860 of the marker placing apparatus according to this embodiment, a "highly-accurate-registration area" may be calculated in accordance with a rule "registration accuracy at a position in a mixed reality space varies in accordance with an angle formed by a normal vector of a marker nearest to the position or a normal vector of a plane where the marker is placed and a visual line vector observing the mixed reality space, the registration accuracy decreases as the angle is approximate to a right angle, and the registration accuracy increases as the angle is approximate to zero degrees." This rule is based on the fact that an image characteristic of a marker can be observed more clearly and an image projected position of the marker can be specified more accurately as the marker is captured from the front, so that registration can be performed more accurately. According to this rule, in a case where only one marker has been captured and an angle θ is assumed as a threshold, when an angle formed by a visual line vector and a normal vector of the marker is smaller than the threshold θ, the entire area of the captured image is a "highly-accurate-registration area," and when the angle is larger than the threshold θ, the entire area of the captured image is not the "highly-accurate-registration area." If two or more markers have been captured, the captured image is divided into some areas depending on which of those markers is the nearest, and whether the respective areas are "highly-accurate-registration areas" is determined based on an angle formed by the visual line vector and a normal line vector of the marker in each area.

Further, the high-accuracy-area calculating unit 860 of the marker placing apparatus according to this embodiment may calculate a "highly-accurate-registration area" by using both of the two above-described rules or by using one of the rules in response to the instructions from the user.

Still further, the high-accuracy-area calculating unit 860 of the marker placing apparatus according to this embodiment may use a rule other than the two above-described rules in order to calculate a "highly-accurate-registration area."

Information indicating the "highly-accurate-registration area" calculated by the high-accuracy-area calculating unit 860 is output to the image generating unit 170.

The image generating unit 170 generates a virtual space image by using the position and orientation of the shooting viewpoint of the image capturing unit 100 in the world coordinate system received from the position/orientation calculating unit 830 and the held virtual space information.

When receiving information indicating a "highly-accurate-registration area" from the high-accuracy-area calculating unit 860, the image generating unit 170 generates virtual image information representing an area where highly accurate registration is likely to be or not likely to be realized in accordance with the information, and generates a virtual space image including the information. The area where highly accurate registration is not likely to be realized is an area outside the "highly-accurate-registration area" determined based on all of the detected markers.

The virtual space image generated by the image generating unit 170 is output to the image mixing unit 180.

The image mixing unit 180 mixes the virtual space image received from the image generating unit 170 onto the captured image received from the image capturing unit 100 so as to generate a mixed reality space image. The mixed reality space image is output to the image display unit 190.

The image display unit 190 displays the mixed reality space image received from the image mixing unit 180 so as to present a mixed reality space to the user. In the mixed reality space, a place where a marker should be newly placed is shown. That is, when the mixed reality space image includes a virtual image representing an area where highly accurate registration is likely to be realized, an area that is not covered by the virtual image is a (possible) area where a marker should be newly placed. On the other hand, when the mixed reality space image includes a virtual image representing an area where highly accurate registration is not likely to be realized, an area covered by the virtual image is a (possible) area where a marker should be newly placed.

Figure 9:
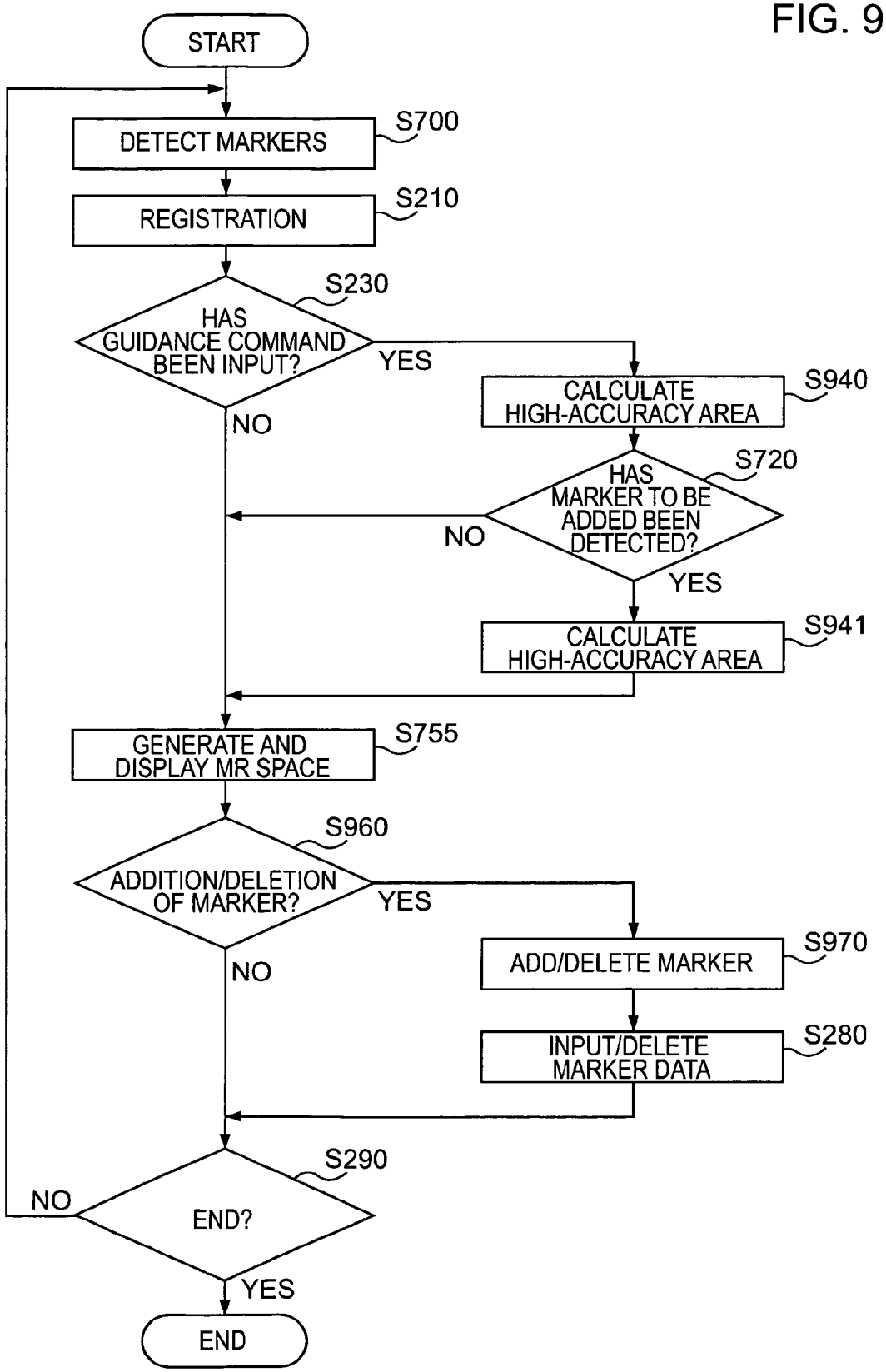
FIG. 9 is a flowchart showing a process performed by the marker placing apparatus according to the third embodiment.

Next, a process performed by the marker placing apparatus according to this embodiment is described with reference to the flowchart shown in FIG. 9. In FIG. 9, parts that are the same as those in FIG. 7 are denoted by the same reference numerals, and the corresponding description will not be repeated here. The program code of this flowchart is stored in a memory of the apparatus, such as a RAM or a ROM (not shown), and is read and executed by a CPU (not shown).

After the process starts, the image capturing unit 100 captures an image of a physical space and outputs the captured image to the marker detecting unit 820 and the image mixing unit 180 in step S700. Then, the marker detecting unit 820 detects markers from the captured image and outputs image coordinates $u^{Qkn}$ and identifiers $k_n$ of the detected markers $Q_{kn}$ to the position/orientation calculating unit 830. Also, the marker detecting unit 820 outputs the image coordinates $u^{Qkn}$ of the detected markers $Q_{kn}$ to the high-accuracy-area calculating unit 860.

Then, in step S210, when the marker placing apparatus includes the position/orientation measuring unit 110, the position/orientation measuring unit 110 measures the position and/or orientation of the shooting viewpoint of the image capturing unit 100. Then, regardless of the existence of the position/orientation measuring unit 110, the position/orientation calculating unit 830 calculates the position and orientation of the shooting viewpoint of the image capturing unit 100 in the world coordinate system. The calculated position and orientation of the shooting viewpoint are output from the position/orientation calculating unit 830 to the image generating unit 170.

In step S230, it is determined whether a placement guidance execution command has been input to the instructing unit 150. If the placement guidance execution command has been input and if the input has not been canceled, the process proceeds to step S940. On the other hand, if the placement guidance execution command has not been input or if the input has been canceled, the process proceeds to step S755.

The input of the placement guidance execution command and cancellation of the input are performed at arbitrary timing by the user through the instructing unit 150.

In step S940, the high-accuracy-area calculating unit 860 receives the identifiers $k_n$ of the markers $Q_{kn}$ detected-in the captured image from the marker detecting unit 820, receives the position and orientation of the shooting viewpoint of the image capturing unit 100 in the world coordinate system from the position/orientation calculating unit 130, and receives the positions $x_w^{Qkn}$ in the world coordinate system of the markers $Q_{kn}$ detected in the captured image from the marker information holding unit 640. Based on the received information, the high-accuracy-area calculating unit 860 calculates a "highly-accurate-registration area" and outputs information indicating the area to the image generating unit 170.

Then, in step S720, it is determined whether a marker $Q_{K+k'}$ to be placed has been detected in the captured image. If the marker has been detected, the process proceeds to step S941. Otherwise, the process proceeds to step S755.

In step S941, the high-accuracy-area calculating unit 860 calculates a high-accuracy area of the marker $Q_{K+k'}$ in the same method as in step S940, and outputs information indicating the area to the image generating unit 170.

Then, in step S755, the image generating unit 170 generates a virtual space image by using the position and orientation of the shooting viewpoint of the image capturing unit 100 in the world coordinate system received from the position/orientation calculating unit 830 and the held virtual space information. Further, if it is determined in step S230 that a guidance command has been input, the image generating unit 170 generates a virtual space image including a virtual object representing an area where highly accurate registration is likely to be realized by using information indicating the "highly-accurate-registration area", received from the high-accuracy-area calculating unit 860. The generated virtual space image is output to the image mixing unit 180. The image mixing unit 180 mixes the virtual space image received from the image generating unit 170 onto the captured image received from the image capturing unit 100 so as to generate a mixed reality space image. The mixed reality space image is output to the image display unit 190. The image display unit 190 displays the mixed reality space image received from the image mixing unit 180 so as to present a mixed reality space to the user. In a state where the mixed reality space image is being shown to the user, the process proceeds to step S960.

In step S960, it is determined whether the user has provided instructions to add a new marker or delete an already placed marker through the instructing unit 150. For example, when the mixed reality space presented by the image display unit 190 includes a virtual image representing an area where highly accurate registration is likely to be realized and when the area does not cover an entire predetermined observed area, the user determines to add a new marker. On the other hand, when the area covers the entire observed area, the user determines not to add any marker. At this time, the user can determine to delete an already placed marker. For example, when the mixed reality space presented by the image display unit 190 includes a virtual image representing an area where highly accurate registration is not likely to be realized and when the area covers the entire observed area, the user determines to add a new marker. On the other hand, when the area does not cover the entire observed area, the user determines not to add any marker. Also, the user can determine to delete an already placed marker.

The user determines whether a new marker should be added or an already placed marker should be deleted while moving in a predetermined movement range. Ideally, determination to add/delete a marker should be performed for observed areas from all points in the movement range.

If the user has provided instructions to place or delete a marker, the process proceeds to step S970. Otherwise, the process proceeds to step S290.

In step S970, the user adds/deletes a desired marker to/from the scene while seeing the mixed reality space image presented by the image display unit 190.

A position of the marker is determined by the user based on the mixed reality space presented by the image display unit 190. For example, if the mixed reality space presented by the image display unit 190 includes a virtual image representing an area where highly accurate registration is likely to be realized, the user sets a position outside the area as a placed position. On the other hand, if the mixed reality space presented by the image display unit 190 includes a virtual image representing an area where highly accurate registration is not likely to be realized, the user sets a position covered by the area as a placed position. At this time, by using a situation where a virtual image representing a "highly-accurate-registration area" is displayed around a marker held by the user and is to be placed, the user places a new marker so that the "highly-accurate-registration area" determined by the placed markers adequately overlaps a "highly-accurate-registration area" determined by the marker to be placed while preventing a gap therebetween being made.

If a marker was added in step S970, information indicating a position $x_w^{QK+k'}$ in the world coordinate system of the newly added marker $Q_{K+k'}$ is added to the marker information holding unit 840 in step S280. This information is added to the marker information holding unit 840 through the instructing unit 150 by the user. Alternatively, a calibration tool (not shown) may be connected to the instructing unit 150 or the marker information holding unit 840, so that the information may be automatically added without requiring an operation by the user.

If a marker was deleted in step S970, information indicating a position $x_w^{QK}$ in the world coordinate system of the marker $Q_K$ deleted from the scene is deleted from the marker information holding unit 840 in step S280. The deleted information is determined in accordance with the instructions to "delete information of a specified marker" from the instructing unit 150 based on specification by the user. Alternatively, the deleted information may be determined in accordance with instructions to "delete information of a specified marker" transmitted from the marker detecting unit 820 when the marker detecting unit 820 cannot detect a previously detected marker when the marker should be detected (when the captured image should include the marker).

After the information about the added or deleted marker has been added or deleted, the process proceeds to step S290.

In step S290, it is determined whether the process performed by the marker placing apparatus of this embodiment should be ended. The process ends if the user instructs the marker placing apparatus to end the process, whereas the process returns to step S700 if the user instructs the apparatus to continue the process. After returning to step S700, the process restarts in a state where a placement state of the markers in the scene is changed.

By performing the above-described process, the marker placing apparatus according to this embodiment presents an area where highly accurate registration is likely to be realized to the user in a simpler manner.

Fourth Embodiment

A marker placing apparatus and a marker placing method according to this embodiment present an area where highly accurate registration is likely to be observed to the user, unlike in the first to third embodiments. Hereinafter, the marker placing apparatus according to this embodiment is described.

Figure 11:
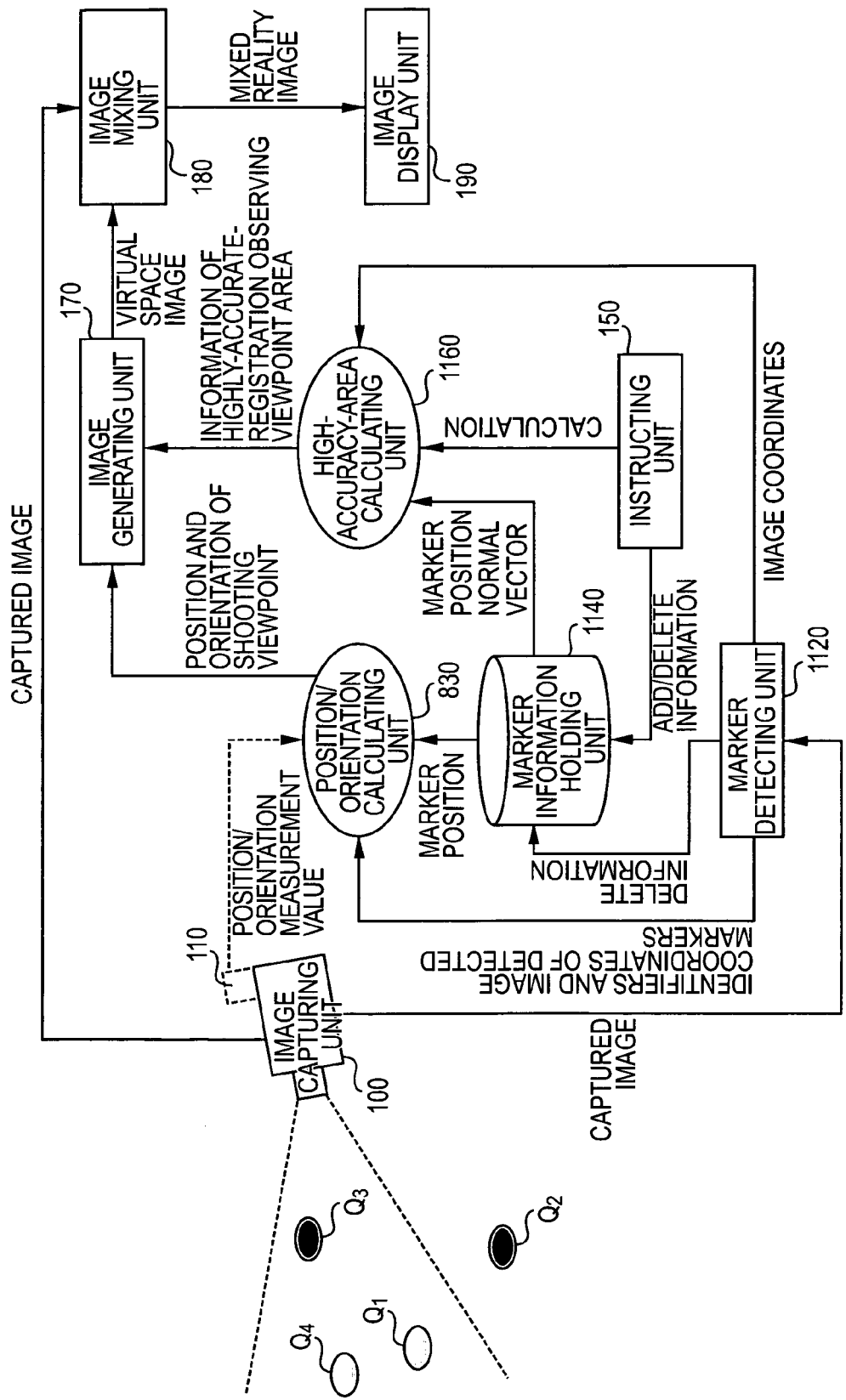
FIG. 11 shows an exemplary configuration of a marker placing apparatus according to a fourth embodiment.

FIG. 11 shows an exemplary configuration of the marker placing apparatus according to this embodiment. In FIG. 11, parts that are the same as those in FIG. 1 or 8 are denoted by the same reference numerals, and the detailed description thereof is not repeated here. As shown in FIG. 11, the marker placing apparatus according to this embodiment includes an image capturing unit 100; a marker detecting unit 1120; a position/orientation calculating unit 830; a marker information holding unit 1140; an instructing unit 150; a high-accuracy-area calculating unit 1160; an image generating unit 170; an image mixing unit 180; and an image display unit 190. Also, the marker placing apparatus according to this embodiment may include a position/orientation measuring unit 110 as necessary.

The image capturing unit 100 captures an image of a physical space. The image captured by the image capturing unit 100 is input to the marker detecting unit 1120 and the image mixing unit 180. In some cases, the image capturing unit 100 may be provided with the position/orientation measuring unit 110 measuring the position and/or orientation of a shooting viewpoint of the image capturing unit 100.

The position/orientation measuring unit 110 (not essential to the marker placing apparatus according to this embodiment) measures the position and/or orientation of the shooting viewpoint of the image capturing unit 100 in the world coordinate system. Measurement values of the position/orientation measuring unit 110 are input to the position/orientation calculating unit 830.

A plurality of markers $Q_k$ (k=1, ... K) to be captured by the image capturing unit, positions thereof $x_w^{Qk}$ in the world coordinate system being known, are placed at a plurality of positions in the physical space. The form of the markers $Q_k$ is the same as in the first embodiment.

The marker detecting unit 1120 receives the captured image from the image capturing unit 100 and detects image coordinates of the markers $Q_k$ existing in the received captured image.

The image coordinates $u^{Qkn}$ and identifiers $k_n$ of the detected markers $Q_{kn}$ are output to the position/orientation calculating unit 830.

If the marker detecting unit 1120 cannot detect a previously detected marker when the marker should be detected (when the marker should be included in the captured image) because the placed marker has been deleted by the user, the marker detecting unit 1120 may transmit instructions to "delete information of a specified marker" indicating deletion of information about the marker to the marker information holding unit 1140.

The position/orientation calculating unit 830 calculates the position and orientation of the shooting viewpoint of the image capturing unit 100 in the world coordinate system based on correspondence between the image coordinates $u^{Qkn}$ of the respective markers $Q_{kn}$ detected by the marker detecting unit 1120 and the world coordinates $x_w^{Qkn}$ of the markers referred to by using the identifiers $k_n$ held in the marker information holding unit 1140 as known information.

When the image capturing unit 100 is provided with the position/orientation measuring unit 110, the position/orientation calculating unit 830 may calculate the position and orientation of the shooting viewpoint of the image capturing unit 100 in the world coordinate system by using a measurement value from the position/orientation measuring unit 110. For example, a measurement value of one of the position and orientation of the shooting viewpoint measured by the position/orientation measuring unit 110 may be used as a calculation result, and the other may be calculated based on the markers. Alternatively, one of the position and orientation held as known information in the position/orientation calculating unit 830 may be used as a calculation result and the other may be calculated based on the markers.

The calculated position and orientation of the shooting viewpoint of the image capturing unit 100 in the world coordinate system are output to the image generating unit 170.

The marker information holding unit 1140 holds positions $x_w^{Qk}$ in the world coordinate system of the marker $Q_k$ that are already placed in the physical space and their identifiers k.

Each marker $Q_k$ is placed at a position in a space, but actually the marker is a plane characteristic such as paper or a plate or a characteristic existing on a plane such as a wall or a desk, and thus a normal vector can be defined thereto. Therefore, the marker information holding unit 1140 holds a normal direction vector $n_w^{Qk}$ in the world coordinate system of each marker $Q_k$. This normal vector is a normal vector held by the marker $Q_k$ or a normal vector of an existing plane.

Also, the marker information holding unit 1140 additionally holds a position $x_w^{QK+k'}$ in the world coordinate system of a marker $Q_{K+k'}$ (k'=1 . . . ) that is newly input by the user through the instructing unit 150, and an identifier K+k' and a normal vector $n_w^{QK+k'}$ thereof. Further, the marker information holding unit 1140 deletes information of a specified marker in response to instructions to "delete information of a specified marker" from the marker detecting unit 1120 or the instructing unit 150.

The positions $x_w^{Qk}$ held by the marker information holding unit 1140 are output to the position/orientation calculating unit 830 and the high-accuracy-area calculating unit 1160. Further, the normal direction vectors $n_w^{Qk}$ held by the marker information holding unit 1140 are output to the high-accuracy-area calculating unit 1160.

When receiving a placement guidance execution command from the user, the instructing unit 150 transmits instructions to "calculate a highly-accurate-registration area" to the high-accuracy-area calculating unit 1160.

When receiving information indicating a position $x_w^{QK+k'}$ in the world coordinate system and a normal direction vector $n_w^{QK}$ of a new marker $Q_{K+k'}$ from the user, the instructing unit 150 transmits the information to the marker information holding unit 1140.

When receiving a placed marker deleting command and an identifier of a target marker from the user, the instructing unit 150 transmits instructions to "delete information about a specified marker" indicating deletion of information about a marker corresponding to the identifier to the marker information holding unit 1140.

When the high-accuracy-area calculating unit 1160 receives instructions to "calculate a highly-accurate-registration area" from the instructing unit 150, the high-accuracy-area calculating unit 1160 receives positions $x_w^{Qkn}$ in the world coordinate system of the markers $Q_{kn}$ detected in the captured image from the marker information holding unit 1140. Then, the high-accuracy-area calculating unit 1160 calculates an area where highly accurate registration can be observed (hereinafter referred to as a "highly-accurate-registration observing viewpoint area" as necessary) based on the received information and outputs information indicating the area to the image generating unit 170.

In the high-accuracy-area calculating unit 1160 in the marker placing apparatus according to this embodiment, a "highly-accurate-registration observing viewpoint area" is calculated in accordance with a rule "a possibility that highly accurate registration can be observed varies in accordance with an angle formed by a normal vector of a detected marker or a normal vector of a plane where the marker is placed and a shooting visual line vector, the accuracy decreases as the angle is approximate to a right angle, and the accuracy increases as the angle is approximate to zero degrees." This rule is based on "an image characteristic of a marker can be observed more clearly and an image projected position of the marker can be specified more accurately as the marker is captured from the front, and thus registration can be performed more accurately." According to this rule and assuming that an angle θ is a threshold, an area where an angle formed by a visual line vector of observing a marker and a normal vector of the marker is smaller than the threshold θ is regarded as a "highly-accurate-registration observing viewpoint area."

Figure 13:
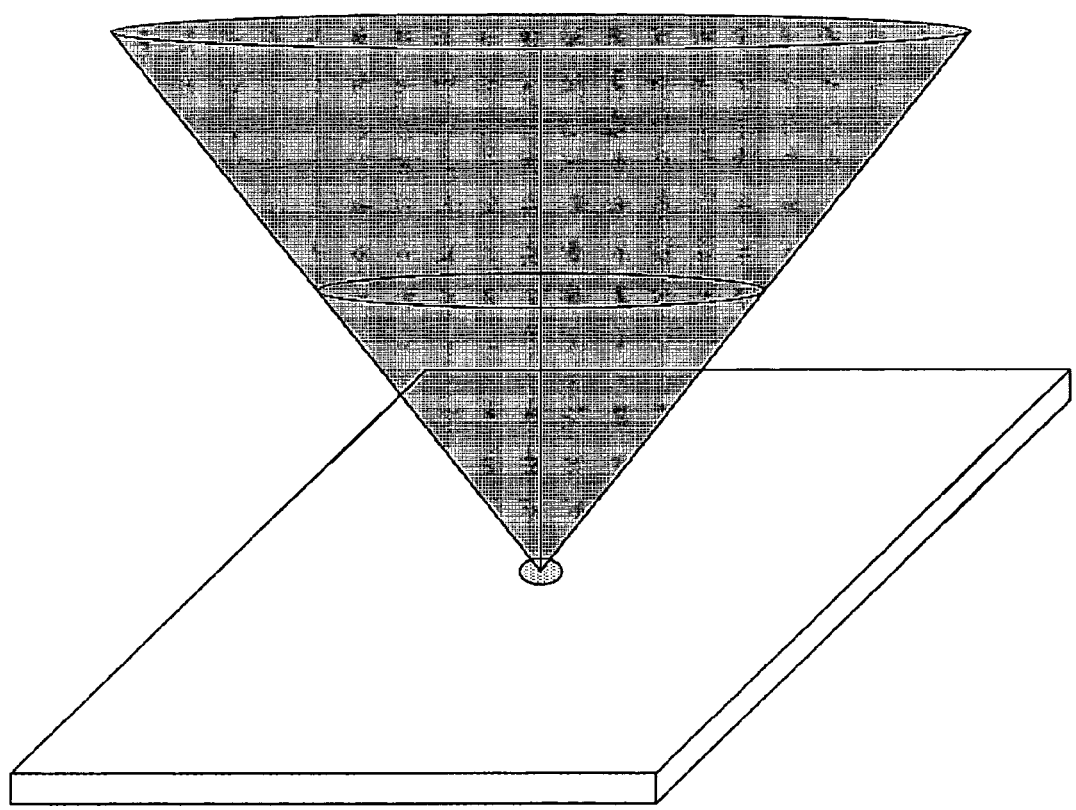
FIG. 13 is an image view showing a "highly-accurate-registration observing viewpoint area" determined based on a marker in the marker placing apparatus according to the fourth embodiment.

FIG. 13 is an image view showing a "highly-accurate-registration observing viewpoint area" determined based on a marker. Hence, the high-accuracy-area calculating unit 1160 outputs information indicating the area, that is, a position $x_w^{QK0}$ and a normal vector $n_w^{QK0}$ of the marker and a threshold angle $\theta^{QK0}$ to the image generating unit 170. Herein, the angle $\theta^{QK0}$ is calculated under a rule of "becoming larger in accordance with a physical size of the marker." For example, the angle $\theta^{QK0}$ is calculated by using an equation: $\theta^{QK0}$=max {45°, 10°×radius (cm) of circumcircle of the marker}. θ may be calculated in another method. Also, in the high-accuracy-area calculating unit 1160 of the marker placing apparatus according to this embodiment, a "highly-accurate-registration observing viewpoint area" may be calculated in accordance with a rule "possibility that highly accurate registration can be observed decreases in accordance with a distance in a mixed reality space from a detected marker." This rule is based on "an image characteristic of a marker can be observed more clearly and an image projected position of the marker can be specified more accurately as the marker can be captured from a nearer position, and thus registration can be performed more accurately." According to this rule and assuming that a distance "r" is a threshold, a sphere area having a radius "r", a position where a marker $Q_{k0}$ exists being its center, is regarded as a "highly-accurate-registration observing viewpoint area." Therefore, the high-accuracy-area calculating unit 1160 outputs information indicating the area, that is, a center position $x_w^{Qk0}$ and a radius $r^{Qk0}$ of the sphere to the image generating unit 170. Herein, the radius $r^{Qk0}$ is calculated in accordance with a rule "proportional to a distance $R^{Qk0}$ between the shooting viewpoint of the image capturing unit 100 and the marker." For example, the radius $r^{Qk0}$ is calculated by using an equation: $r^{Qk0}$=0.3 (constant)× $R^{Qk0}$. The $R^{Qk0}$ can be calculated based on positions $x_w^{Qkn}$ of the markers $Q_k$ detected in the captured image received from the marker information holding unit 1140 and the position of the shooting viewpoint received from the position/orientation calculating unit 830. The "r" can be calculated using another method.

The high-accuracy-area calculating unit 1160 of the marker placing apparatus according to this embodiment may calculate a "highly-accurate-registration observing viewpoint area" by using both of the two above-described rules or by using one of the rules in accordance with the instructions from the user.

Further, in the high-accuracy-area calculating unit 1160 of the marker placing apparatus according to this embodiment, a rule other than the two above-described rules may be used to calculate a "highly-accurate-registration observing viewpoint area."

Information indicating the "highly-accurate-registration observing viewpoint area" calculated by the high-accuracy-area calculating unit 1160 is output to the image generating unit 170.

The image generating unit 170 generates a virtual space image by using the position and orientation of the shooting viewpoint of the image capturing unit 100 in the world coordinate system received from the position/orientation calculating unit 830 and the held virtual space information.

When receiving information indicating a "highly-accurate-registration observing viewpoint area" from the high-accuracy-area calculating unit 1160, the image generating unit 170 generates virtual object information indicating an area where highly accurate registration can be observed in accordance with the information and generates a virtual space image including the virtual object information.

The virtual space image generated by the image generating unit 170 is output to the image mixing unit 180.

The image mixing unit 180 mixes the virtual space image received from the image generating unit 170 onto the capture image received from the image capturing unit 100 so as to generate a mixed reality space image. The mixed reality space image is output to the image display unit 190.

The image display unit 190 displays the mixed reality space image received from the image mixing unit 180 so as to present a mixed reality space to the user. In the mixed reality space, an area where highly accurate registration is likely to be observed is shown. Then, the user adds markers so that an entire predetermined observing viewpoint area becomes an area where highly accurate registration is likely to be observed.

Figure 12:
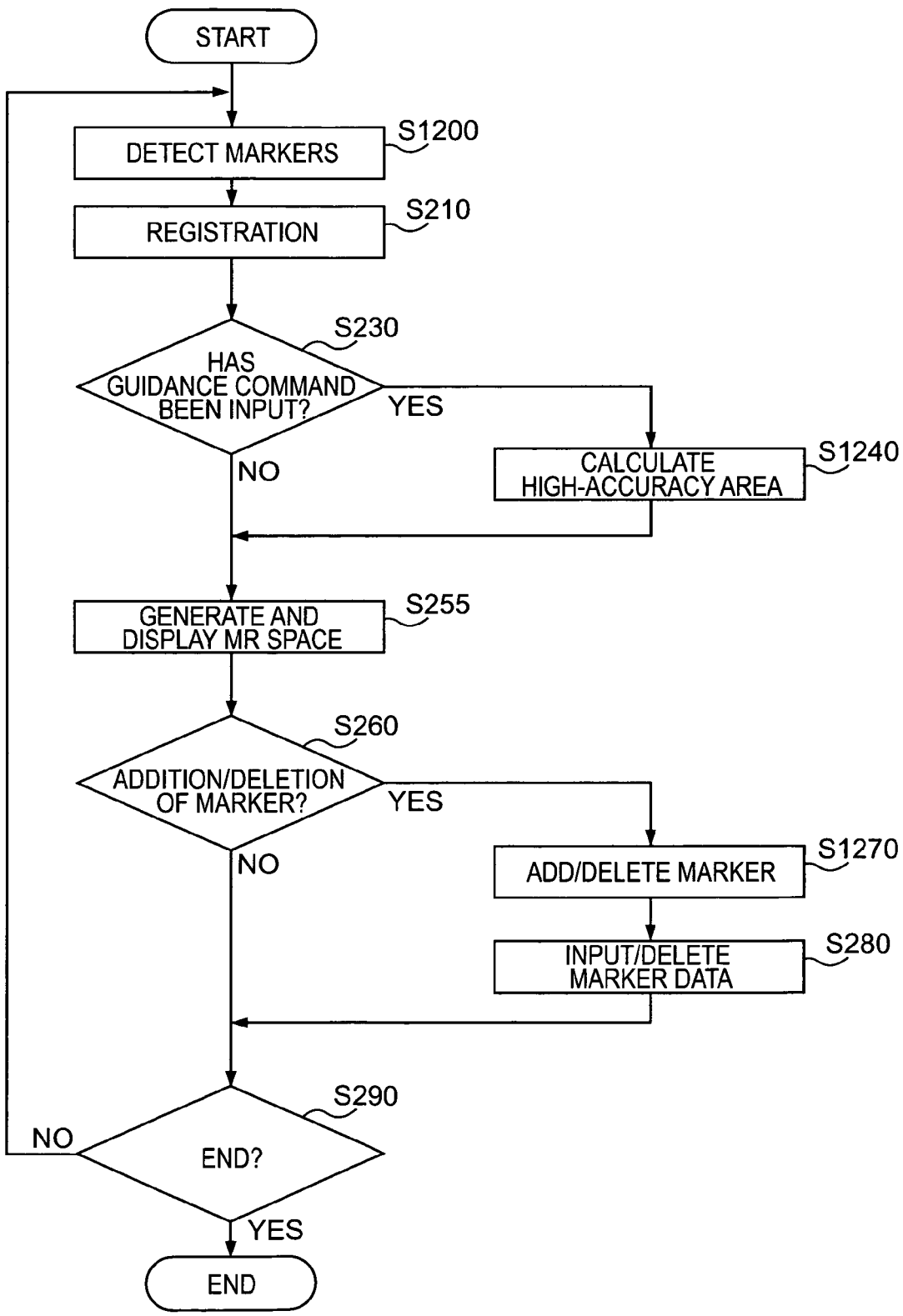
FIG. 12 is a flowchart showing a process performed by the marker placing apparatus according to the fourth embodiment.

Next, a process performed by the marker placing apparatus according to this embodiment is described with reference to the flowchart shown in FIG. 12. In FIG. 12, parts that are the same as those in FIG. 2 are denoted by the same reference numerals, and the detailed description is not repeated here. The program code of the flowchart is stored in a memory of the apparatus of this embodiment, such as a RAM or a ROM (not shown), and is read and executed by a CPU (not shown).

After the process starts, the image capturing unit 100 captures an image of a physical space and outputs the captured image to the marker detecting unit 1120 and the image mixing unit 180 in step S1200. Then, the marker detecting unit 1120 detects markers from the captured image and outputs image coordinates $u^{Qkn}$ and identifiers $k_n$ of the detected markers $Q_{kn}$ to the position/orientation calculating unit 830.

Then, in step S210, when the marker placing apparatus includes the position/orientation measuring unit 110, the position/orientation measuring unit 110 measures the position and/or orientation of the shooting viewpoint of the image capturing unit 100. Then, regardless of the existence of the position/orientation measuring unit 110, the position/orientation calculating unit 830 calculates the position and orientation of the shooting viewpoint of the image capturing unit 100 in the world coordinate system. The calculated position and orientation of the shooting viewpoint are output from the position/orientation calculating unit 830 to the image generating unit 170.

In step S230, it is determined whether a placement guidance execution command has been input to the instructing unit 150. If the placement guidance execution command has been input and if the input has not been canceled, the process proceeds to step S1240. On the other hand, if the placement guidance execution command has not been input or if the input has been canceled, the process proceeds to step S255. The input of the placement guidance execution command and cancellation of the input are performed at arbitrary timing by the user through the instructing unit 150.

In step S1240, the high-accuracy-area calculating unit 1160 receives the image coordinates $u^{Qkn}$ of the markers $Q_{kn}$ detected in the captured image from the marker detecting unit 1120. Then, the high-accuracy-area calculating unit 1160 calculates a "highly-accurate-registration observing viewpoint area" based on the received information and output information indicating the area to the image generating unit 170.

Then, in step S255, the image generating unit 170 generates a virtual space image by using the position and orientation of the shooting viewpoint of the image capturing unit 100 in the world coordinate system received from the position/orientation calculating unit 830 and the held virtual space information. If it is determined in step S230 that a placement guidance execution command has been input to the instructing unit 150, the image generating unit 170 generates a virtual space image including a virtual image representing an area where highly accurate registration is likely to be observed by using information indicating the "highly-accurate-registration observing viewpoint area" received from the high-accuracy-area calculating unit 1160. The generated virtual space image is output to the image mixing unit 180. The image mixing unit 180 mixes the virtual space image received from the image generating unit 170 onto the captured image received from the image capturing unit 100 so as to generate a mixed reality space image. The mixed reality space image is output to the image display unit 190. The image display unit 190 displays the mixed reality space image received from the image mixing unit 180 so as to present a mixed reality space to the user. In a state where the mixed reality space image is presented to the user, the process proceeds to step S260.

In step S260, it is determined whether the user has input instructions to add a new marker or delete an already placed marker to the instructing unit 150. In the mixed reality space presented by the image display unit 190, a "highly-accurate-registration observing viewpoint area" is indicated by a virtual object. Thus, if the area does not cover an entire predetermined observing viewpoint area, the user determines to add a new marker. On the other hand, if the area covers the entire observing viewpoint area, the user determines not to add any marker. In this case, the user can determine to delete an already placed marker.

A position where a marker should be placed is determined by the user based on the mixed reality space presented by the image display unit 190. In the mixed reality space presented by the image display unit 190, the "highly-accurate-registration observing viewpoint area" is indicated by a virtual object. Thus, the user places a marker so that an area that is not covered by the "highly-accurate-registration observing viewpoint area" in the entire predetermined observing viewpoint area is covered by the "highly-accurate-registration observing viewpoint area."

On the other hand, the user determines which marker among the placed markers should be deleted based on a placement distribution of the markers. For example, the used deletes part of the markers from an area where the markers are placed most densely in the mixed reality space image. If the "highly-accurate-registration observing viewpoint area" decreases due to the deletion, the deletion can be canceled.

Addition or deletion of a marker can be performed a plurality of times at one time, or addition and deletion can be performed in the same process.

When the user provides instructions to add or delete a marker, the process proceeds to step S1270. Otherwise, the process proceeds to step S290.

In step S1270, the user adds or deletes a desired marker while seeing the mixed reality space image presented by the image display unit 190.

After the user has added and/or deleted a marker, the process proceeds to step S280.

If a marker was added in or after step S1270, information indicating a position $x_w^{QK+k'}$ in the world coordinate system of the newly added marker $Q_{K+k'}$ is added to the marker information holding unit 1140 in step S280. This information is added to the marker information holding unit 1140 by the user through the instructing unit 150. Alternatively, a calibration tool (not shown) is connected to the instructing unit 150 or the marker information holding unit 1140, so that the information is automatically added without requiring an operation by the user.

If a marker was deleted in or after step S1270, information indicating a position $x_w^{Qk}$ in the world coordinate system of the marker $Q_k$ deleted from the scene is deleted from the marker information holding unit 1140 in step S280. The deleted information is determined in accordance with instructions to "delete information of a specified marker" from the instructing unit 150 based on the instructions from the user. Alternatively, the deleted information is determined based on the instructions to "delete information of a specified marker" transmitted from the marker detecting unit 1120 when the marker detecting unit 1120 cannot detect a previously detected marker (when the captured image should include the marker) because the marker has been deleted.

After information about an added or deleted marker has been added or deleted, the process proceeds to step S290.

In step S290, it is determined whether the process performed by the marker placing apparatus of this embodiment should be ended. If the user instructs the marker placing apparatus to end the process, the process is ended. If the user instructs the marker placing apparatus to continue the process, the process returns to step S1200. After returning to step S1200, the process restarts in a state where a placement state of the markers in the scene is changed.

By performing the above-described process, the marker placing apparatus according to this embodiment presents an area where highly accurate registration is likely to be observed to the user.

<Modification 4-1>

In the fourth embodiment, a highly-accurate-registration observing viewpoint area is calculated every time the image capturing unit captures an image and a marker is detected in the image. However, the highly-accurate-registration observing viewpoint area need not always be calculated in such a manner. The highly-accurate-registration observing viewpoint area is determined regardless of the current position and orientation of the image capturing unit 100, and the highly-accurate-registration observing viewpoint area changes when a marker held by the marker information holding unit 140 is added/deleted or when the position in the world coordinate system of the marker is changed. Therefore, the highly-accurate-registration observing viewpoint area may be calculated only when some changes occur. Alternatively, the highly-accurate-registration observing viewpoint area may be calculated at predetermined time intervals (e.g., once every 30 seconds). In this modification, when a cost of calculating a highly-accurate-registration observing viewpoint area is high, a highly-accurate-registration area can be presented to the user while maintaining a real-time performance of presenting a mixed reality space image.

Fifth Embodiment

In the fourth embodiment, it is assumed that a marker is a point in a three dimensional space. In the fifth embodiment, a highly-accurate-registration observing viewpoint area is presented in accordance with a character of a marker when the marker is a polygonal marker having four or more tops.

In a polygonal marker having four or more tops, the four or more tops exist in the same plane. Therefore, the position and orientation of the image capturing unit can be obtained by using two dimensional homography by detecting a polygonal marker in an image. In this embodiment, a highly-accurate-registration observing viewpoint area is calculated by regarding a polygonal marker as a single marker instead of by regarding respective tops of a polygonal marker as individual markers.

Figure 14:
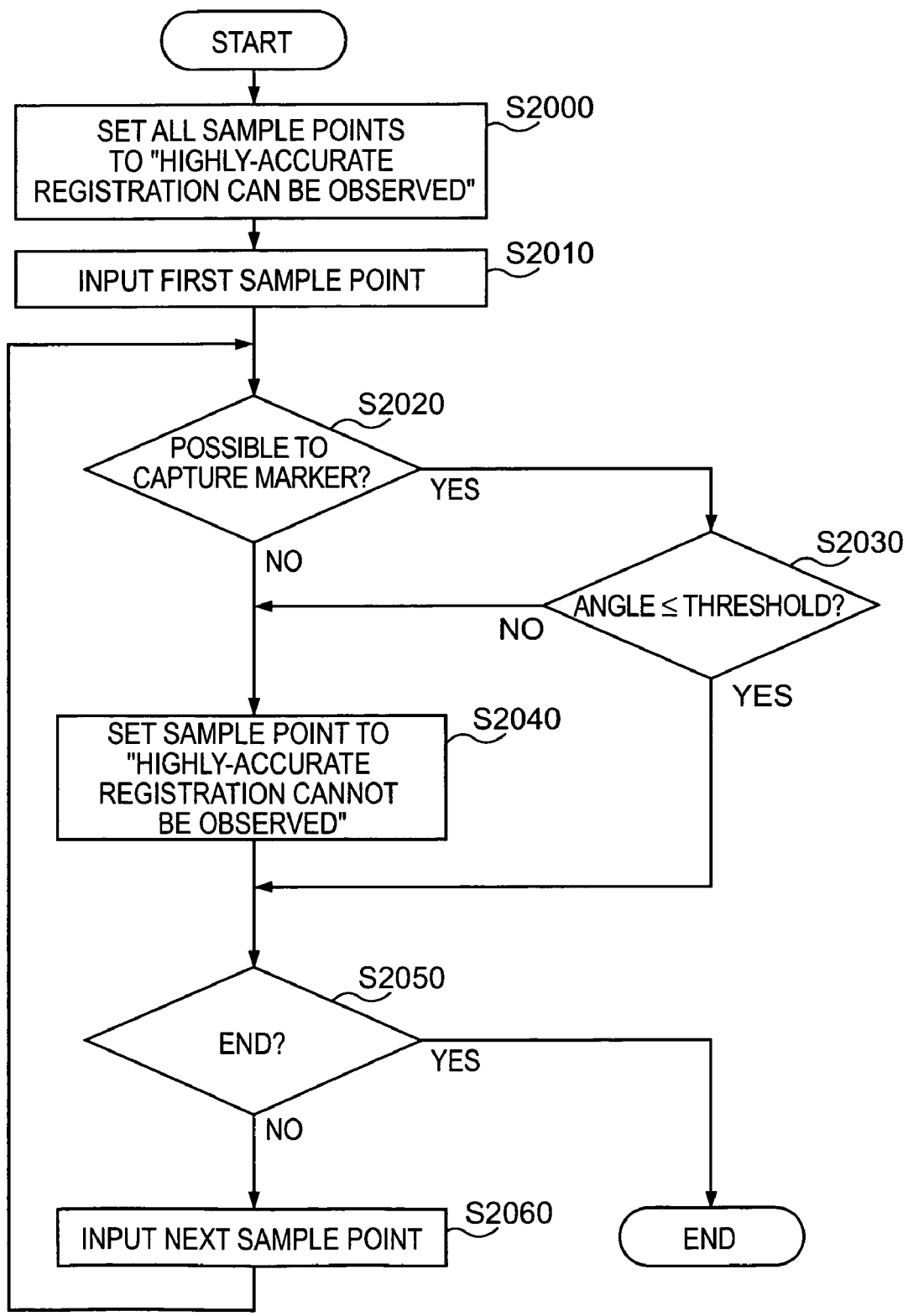
FIG. 14 is a flowchart showing a process performed by a marker placing apparatus according to a fifth embodiment.

FIG. 14 is a flowchart showing a process of calculating a highly-accurate-registration observing viewpoint area in this embodiment.

In step S2000, all sample points are set to "highly accurate registration can be observed." Herein, the sample points are positions where the image capturing unit can exist in a space where a marker is placed. The sample points may exist throughout the space or at part of the space. The sampling interval of the sample points may be arbitrarily set. However, for example, the space is divided into cubes of 3 cm on a side, and the barycenters of the cubes are used as the sample points.

Then, in step S2010, three dimensional coordinates of a first sample point are input.

Then, in step S2020, it is determined whether a target polygonal marker can be captured at the sample point. Since the polygonal marker spreads in a space, it cannot be observed if the viewpoint (sample point) is too close to the marker. Whether the polygonal marker can be captured is determined by estimating whether the marker is placed within a frame when a center of the marker is seen from each sample point. Also, since image resolution is limited, the marker cannot be detected if a distance between the marker and the viewpoint is too long. Therefore, a minimum size of the marker (e.g., the marker in an image corresponds to 100 or more pixels) to be recognized on the image is predetermined, the size of the marker on the image captured from the sample point is calculated, and the calculated size is compared to the minimum size, so as to determine whether the marker can be captured. If it is determined in step S2020 that the marker can be captured, the process proceeds to step S2030. Otherwise, the process proceeds to step S2040.

In step S2030, it is determined whether a highly accurate registration can be observed at the sample point in accordance with a rule "possibility that highly accurate registration can be observed varies in accordance with an angle formed by a normal vector of a detected marker and a shooting visual line vector, the accuracy decreases as the angle is approximate to a right angle, and the accuracy increases as the angle is approximate to zero degrees." The determination is performed by comparing an angle formed by a line segment connecting the sample point and the center of the marker and a normal vector of the marker with a predetermined threshold $\theta$. If the angle formed by the line segment and the normal vector is larger than the threshold $\theta$, highly accurate registration cannot be observed and thus the process proceeds to step S2040. If the angle is equal to or smaller than the threshold $\theta$, highly accurate registration can be observed and thus the process proceeds to step S2050.

In step S2040, it is set that highly accurate registration cannot be observed at the sample point.

Then, in step S2050, it is determined whether determination of whether highly accurate registration can be observed has been done for all of the sample points. If the determination has been completed, processing ends. Otherwise, if the determination has not been completed, three dimensional coordinates of a next sample point are input in step S2060, and then the process returns to step S2020.

Figure 15:
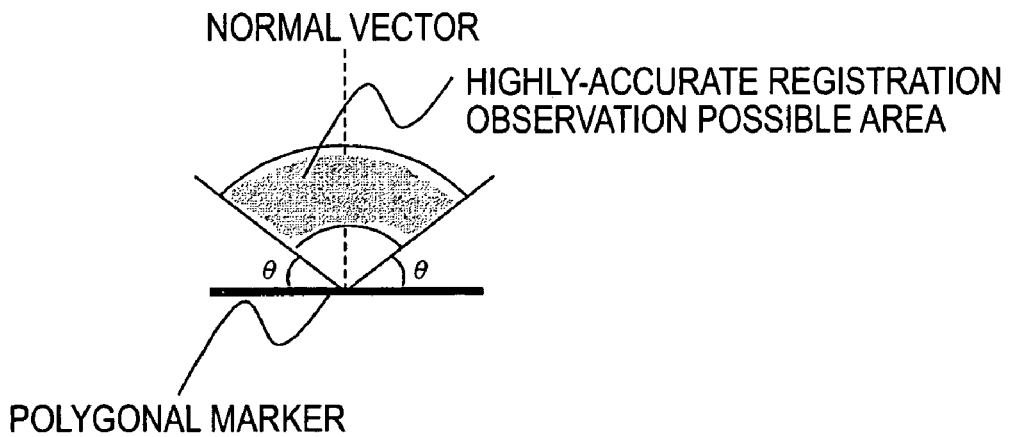
FIG. 15 shows a method for presenting a "highly-accurate-registration observing viewpoint area" according to the fifth embodiment.

The highly-accurate-registration observing viewpoint area calculated in the above-described manner is presented to the user in a form of a virtual object including all sample points where highly accurate registration can be observed and not including any sample point where highly accurate registration cannot be observed. FIG. 15 shows an example of a highly-accurate-registration observing viewpoint area presented to the user. FIG. 15 shows a highly-accurate-registration observing viewpoint area when a marker is seen edge-on. As shown in FIG. 15, the highly-accurate-registration observing viewpoint area is equivalent to a three dimensional object generated by rotating a sector shape by 360 degrees from which a similar object is removed.

By performing the above-described process, when a polygonal marker is placed in a scene, a highly-accurate-registration observing viewpoint area peculiar to the polygonal marker can be calculated and presented to the user.

<Modification 5-1>

Figure 16:
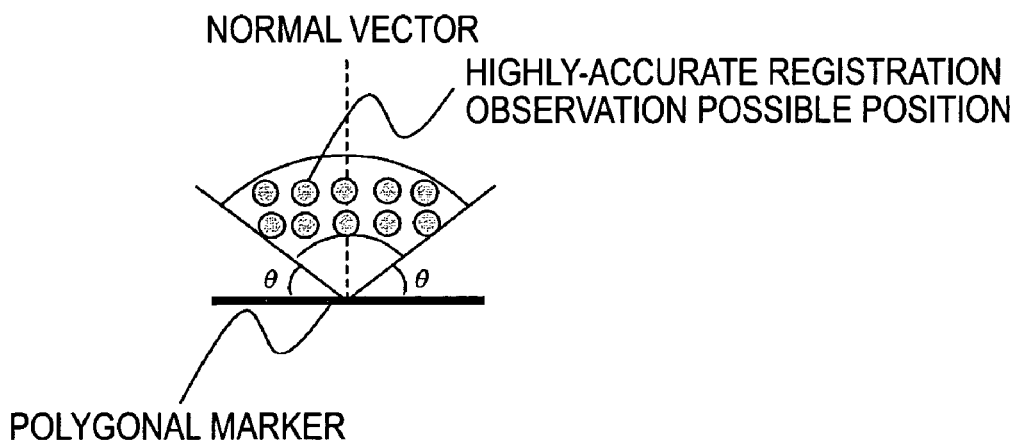
FIG. 16 shows a method for presenting a "highly-accurate-registration observing viewpoint area" according to a modification.
Figure 17:
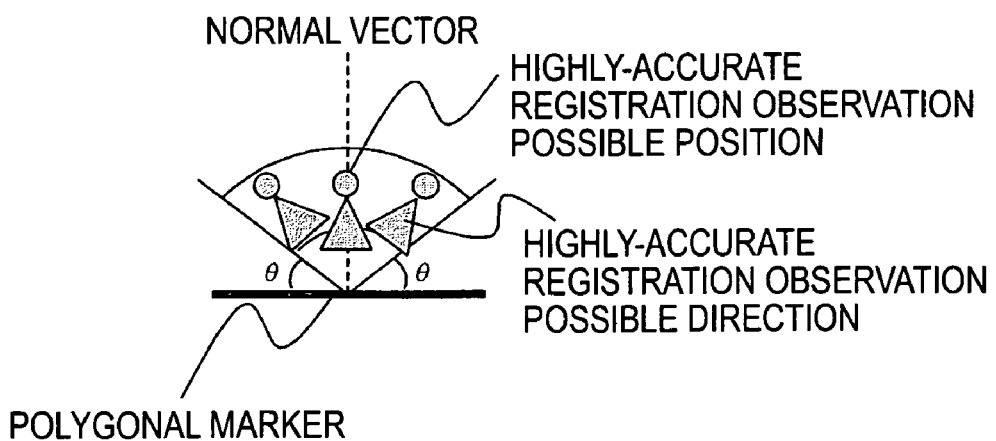
FIG. 17 shows a method for presenting a "highly-accurate-registration observing viewpoint area" according to the modification.

In the fourth and fifth embodiments, a highly-accurate-registration observing viewpoint area is displayed in a form of a virtual object including the area in a mixed reality space. However, the method for presenting a highly-accurate-registration observing viewpoint area is not limited to this method. For example, as shown in FIG. 16, sample points in the fifth embodiment where highly accurate registration can be observed can be presented to the user by displaying virtual objects of small spheres. Also, virtual objects of small spheres may be displayed at sample points where highly accurate registration cannot be observed, or whether highly accurate registration can be observed may be presented by varying a color, size, or transparency of each small sphere. Alternatively, as shown in FIG. 17, virtual objects (e.g., cone objects) indicating a direction in which highly accurate registration can be observed may be presented together with the small spheres indicating positions.

<Modification 5-2>

In the fourth and fifth embodiments, the position and orientation of the shooting viewpoint in the world coordinate system are calculated based on a projected image of markers existing in a scene. However, the method for calculating the position and orientation of the shooting viewpoint is not limited to this method, but another method may be used. For example, a magnetic, ultrasonic, or optical six-degree-of-freedom position/orientation sensor may be attached to the image capturing unit, and the position and orientation of the shooting viewpoint may be obtained based on a measurement value from the sensor.

Other Embodiments

The present invention can be carried out by supplying a storage medium (or a recording medium) storing program code (software) realizing the functions of the above-described embodiments to a system or an apparatus and by allowing a computer (or CPU or micro-processing unit (MPU)) of the system or apparatus to read and execute the program code stored in the storage medium. In this case, the program code read from the storage medium realizes the functions of the above-described embodiments. The functions of the above-described embodiments may be realized when the computer reads and executes the program code or when an operating system (OS) operating in the computer executes part or all of actual processing based on the instructions of the program code.

Further, after the program code read from the storage medium has been written into a memory of a function expanding card inserted into the computer or a function expanding unit connected to the computer, a CPU or the like included in the function expanding card or the function expanding unit may execute part or all of actual processing based on the instructions of the program code, and the processing may realize the functions of the above-described embodiments.

Figure 2:
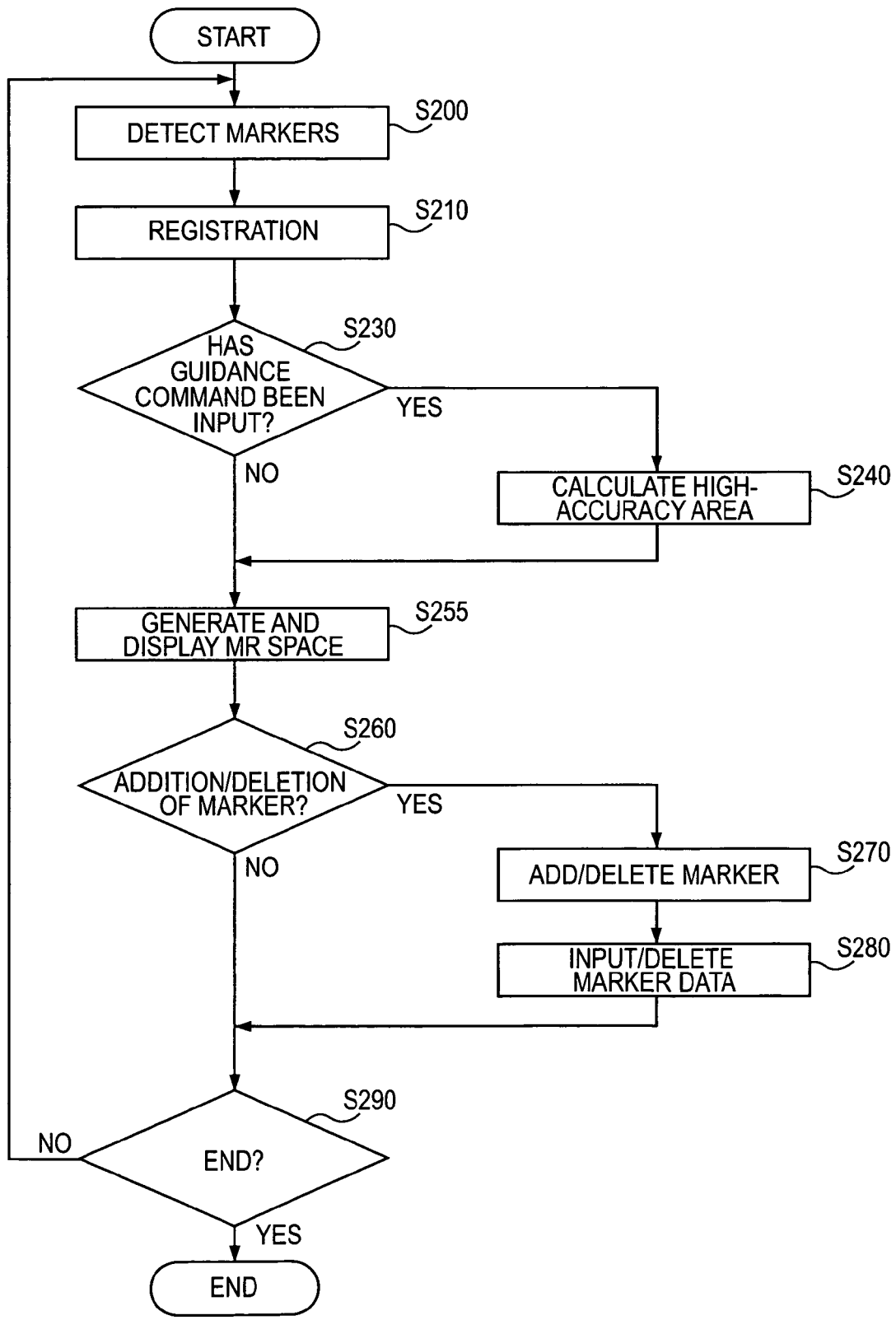
FIG. 2 is a flowchart showing a process performed by the marker placing apparatus according to the first embodiment.
Figure 3:
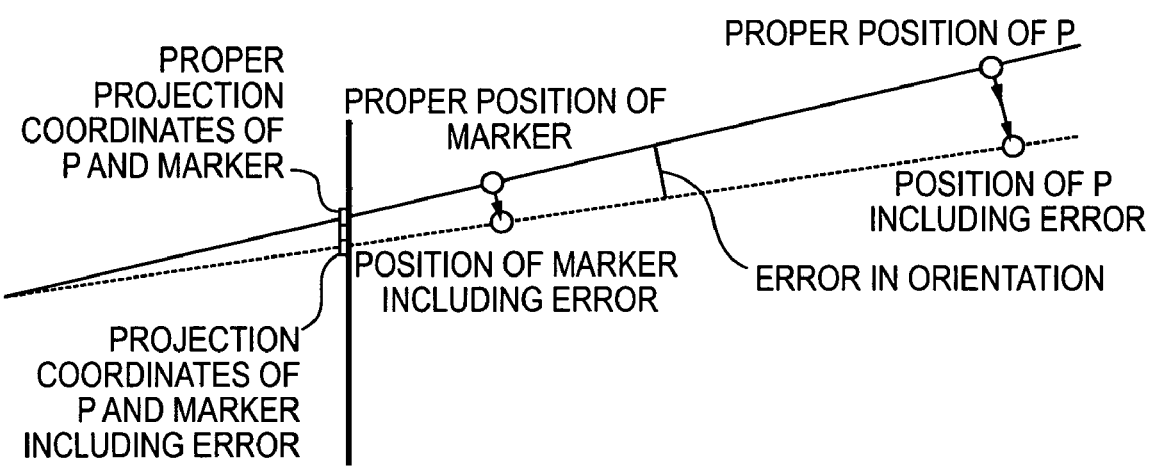
FIG. 3 shows that, when an orientation of a shooting viewpoint includes an error, registration accuracy in a space far from the shooting viewpoint relative to a marker is significantly lower than at a space near the marker.
Figure 4:
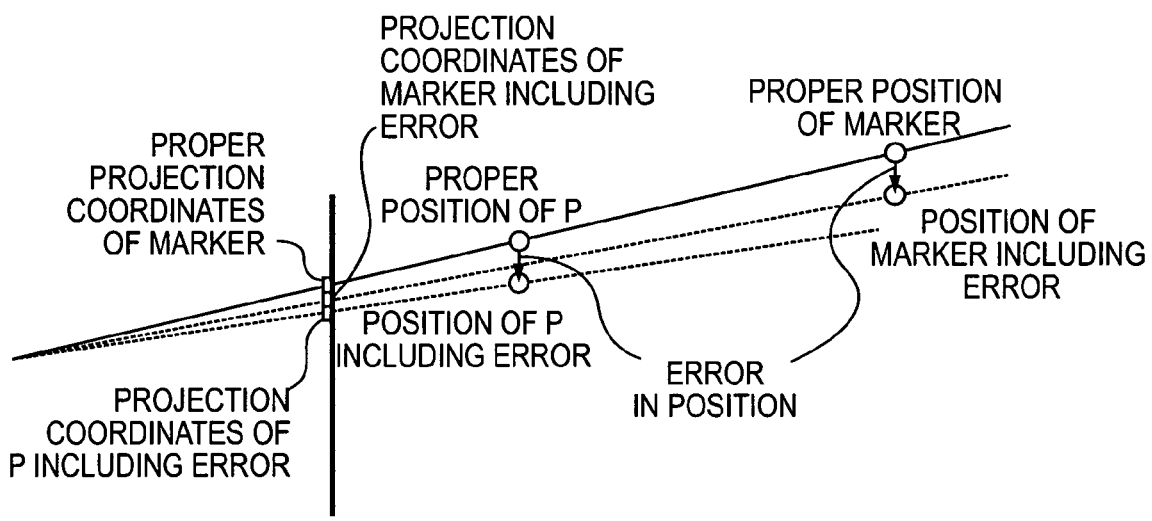
FIG. 4 shows that, when a position of a shooting viewpoint includes an error, registration accuracy in a space close to the shooting viewpoint relative to a marker is significantly lower than at a space near the marker.

When the present invention is applied to the above-described storage medium, the storage medium stores program code corresponding to the above-described flowchart (shown in FIG. 2 and/or FIG. 7 and/or FIG. 9 and/or FIG. 12).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Applications No. 2004-281309 filed Sep. 28, 2004 and No. 2005-204515 filed Jul. 13, 2005, which are hereby incorporated by reference herein in their entirety.

What is claimed is:

1. An information processing method for displaying a mixed image obtained by combining an image of a physical space and an image of a virtual space, the information processing method comprising:

a detecting step of detecting markers from a captured image of the physical space, the markers being placed in the physical space;

an obtaining step of obtaining position information about the markers;

a position/orientation calculating step of calculating a position and/or orientation of a viewpoint of the captured image based on image coordinates of the detected markers and the obtained position information about the detected markers;

a highly accurate registration area calculating step of calculating highly accurate registration area information based on the obtained position information about the detected markers and a predetermined rule;

a generating step of generating a virtual space image based on the position and orientation of the viewpoint and the highly accurate registration area information; and an image display step of displaying a mixed reality image obtained by combining the captured image and the virtual space image, wherein a highly accurate registration area indicated by the highly accurate registration area information is an area where the position and/or orientation of the viewpoint can be calculated with a high degree of accuracy by using the markers placed in the physical space, and the highly accurate registration area is in the physical space.

2. The information processing method according to claim 1, wherein the obtaining step obtains the position information and normal vectors of the markers, and the highly accurate registration area calculating step calculates the highly accurate registration area information based on the position information about the detected markers, the normal vectors of the markers, and the predetermined rule.

3. The information processing method according to claim 1, wherein the highly accurate registration area calculating step calculates the highly accurate registration area information based on the position of the viewpoint and area information of the markers.

4. The information processing method according to claim 1, wherein the predetermined rule varies depending on the number of the detected markers.

5. The information processing method according to claim 1, wherein the highly accurate registration area calculating step calculates the highly accurate registration area information based on the number of the detected markers and the number of markers in which a distance in the physical space to the detected markers is within a predetermined range.

6. The information processing method according to claim 1, wherein the obtaining step obtains information about a marker to be added, and the highly accurate registration area calculating step calculates the highly accurate registration area information by using the information about the marker to be added.

7. The information processing method according to claim 1, further comprising:
- a marker selecting step of selecting a marker placed in the physical space,
- wherein the highly accurate registration area calculating step calculates the highly accurate registration area information based on the information about the markers except the marker selected in the marker selecting step.

8. A computer-readable medium having a computer program stored thereon for allowing a computer to realize the information processing method according to claim 1.

9. An information processing apparatus for displaying a mixed image obtained by combining an image of a physical space and an image of a virtual space, the information processing apparatus comprising:
- a detecting unit configured to detect markers from a captured image of the physical space, the markers being placed in the physical space;
- an obtaining unit configured to obtain position information about the markers;
- a position/orientation calculating unit configured to calculate a position and/or orientation of a viewpoint of the captured image based on image coordinates of the detected markers and the obtained position information about the detected markers;
- a highly accurate registration area calculating unit configured to calculate highly accurate registration area information based on the obtained position information about the detected markers and a predetermined rule;
- a generating unit configured to generate a virtual space image based on the position and orientation of the viewpoint and the highly accurate registration area information; and
- an image display unit configured to display a mixed reality image obtained by visually combining the captured image and the virtual space image,
- wherein a highly accurate registration area indicated by the highly accurate registration area information is an area where the position and/or orientation of the viewpoint can be calculated with a high degree of accuracy by using the markers placed in the physical space, and the highly accurate registration area is in the physical space.

* * * * *